US012518690B2

(12) United States Patent
Kim et al.

(10) Patent No.: US 12,518,690 B2

(45) Date of Patent: Jan. 6, 2026

(54) LEVEL SHIFTER FOR DISPLAY DEVICE REDUCING NUMBER OF DATA BITS FOR SPECIFYING AN OUTPUT CHANNEL AND DISPLAY DEVICE INCLUDING THE SAME

(71) Applicant: LG Display Co., Ltd., Seoul (KR)

(72) Inventors: Jung Jae Kim, Paju-si (KR); Sang Uk Lee, Paju-si (KR); Jae Won Han, Paju-si (KR); Min Gyu Park, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 0 days.

(21) Appl. No.: 18/917,858

(22) Filed: Oct. 16, 2024

(65) Prior Publication Data

US 2025/0148964 A1 May 8, 2025

(30) Foreign Application Priority Data

Nov. 8, 2023 (KR) ........................ 10-2023-0153724

(51) Int. Cl.
*G09G 3/32* (2016.01)
*G09G 3/36* (2006.01)

(52) U.S. Cl.
CPC ............ *G09G 3/32* (2013.01); *G09G 3/3677* (2013.01); *G09G 2310/0267* (2013.01); *G09G 2310/0289* (2013.01); *G09G 2310/08* (2013.01)

(58) Field of Classification Search
CPC .......... G09G 3/30; G09G 3/32; G09G 3/3208; G09G 3/3216; G09G 3/3225; G09G 3/3233; G09G 3/3241; G09G 3/325; G09G 3/3258; G09G 3/3266; G09G 3/36; G09G 3/3611; G09G 3/3614; G09G 3/3622; G09G 3/3625; G09G 3/364; G09G 3/3644; G09G 3/3674; G09G 3/3677; G09G 3/3681; G09G 3/3685; G09G 3/3688; G09G 3/3692; G09G 3/3696; G09G 2310/0289; G09G 2310/0291; G09G 2310/0294
(Continued)

(56) References Cited

U.S. PATENT DOCUMENTS

| | | | | |
|---|---|---|---|---|
| 12,374,266 B2 * | 7/2025 | Han | ..................... | G09G 3/2096 |
| 2002/0186211 A1 * | 12/2002 | Akai | .................... | G09G 3/3659 345/204 |

(Continued)

FOREIGN PATENT DOCUMENTS

| | | |
|---|---|---|
| KR | 10-0229407 B1 | 11/1999 |
| KR | 10-2358534 B1 | 2/2022 |
| KR | 10-2435216 B1 | 8/2022 |

*Primary Examiner* — Ke Xiao
*Assistant Examiner* — Nelson Lam
(74) *Attorney, Agent, or Firm* — Birch, Stewart, Kolasch & Birch, LLP

(57) ABSTRACT

Provided is a display device including a display panel configured to display an image, a scan driver configured to supply a scan signal to the display panel, a level shifter configured to generate gate control signals to drive the scan driver, a power supply configured to supply a voltage to the level shifter, and a timing controller configured to control the level shifter. The level shifter includes a level shifter output setting circuit implemented, so that at least one output channel is selected based on transmission signals supplied from the timing controller and an output state of the selected output channel is selected as a high voltage or a low voltage.

8 Claims, 23 Drawing Sheets

(58) Field of Classification Search
USPC ........................................ 345/76–83, 87–104
See application file for complete search history.

(56) References Cited

U.S. PATENT DOCUMENTS

| | | | | |
|---|---|---|---|---|
| 2014/0049532 | A1* | 2/2014 | Choi | G09G 5/00<br>345/213 |
| 2014/0210700 | A1* | 7/2014 | Won | G09G 3/3677<br>345/102 |
| 2015/0364078 | A1* | 12/2015 | Shim | G09G 3/2092<br>345/211 |
| 2015/0364114 | A1* | 12/2015 | Smith | G09G 3/3696<br>345/89 |
| 2016/0042684 | A1* | 2/2016 | Kim | G09G 3/3674<br>345/55 |
| 2016/0182048 | A1* | 6/2016 | Shin | G09G 3/3648<br>327/333 |
| 2018/0366082 | A1* | 12/2018 | Chen | G09G 3/3674 |
| 2022/0139325 | A1* | 5/2022 | Lee | G09G 3/3266<br>345/694 |

* cited by examiner

LEVEL SHIFTER FOR DISPLAY DEVICE REDUCING NUMBER OF DATA BITS FOR SPECIFYING AN OUTPUT CHANNEL AND DISPLAY DEVICE INCLUDING THE SAME

CROSS-REFERENCE TO RELATED APPLICATION

This application claims priority y to Korean Patent Application No. 10-2023-0153724, filed in the Republic of Korea on Nov. 8, 2023, which is hereby expressly incorporated by reference into the present application.

BACKGROUND

Field

The present disclosure relates to a level shifter and a display device including the same.

Discussion of the Related Art

With the development of information technology, the market for display devices that are used to provide connection between users and information has been growing. Accordingly, display devices such as a light-emitting display (LED) device, a quantum dot display (QDD), and a liquid crystal display (LCD) have been increasingly used.

The above display devices each include a display panel including subpixels, a driver configured to output a driving signal for driving of the display panel, and a power supply configured to generate power to be supplied to the display panel or the driver.

In such a display device, when subpixels formed in a display panel are supplied with driving signals (for example, scan signals and data signals), a selected one of the subpixels can transmit light therethrough or can directly emit light, thereby displaying an image.

SUMMARY OF THE DISCLOSURE

Accordingly, aspects of the present disclosure are directed to a level shifter and a display device including the same that substantially obviate one or more problems due to limitations and disadvantages of the related art.

one or more aspects of the present disclosure provide a signal transmission and control system capable of reducing the number of data bits for specifying an output channel, shortening data transmission and reception time, easily specifying an output channel and an output state, and easily modulating (gate voltage modulation) a level of an output voltage when using a serial-parallel interface between a level shifter and a timing controller.

Additional advantages, objects, and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description and claims hereof as well as the appended drawings.

To achieve these objects and other advantages and in accordance with the purpose of the disclosure, as embodied and broadly described herein, a display device includes a display panel configured to display an image, a scan driver configured to supply a scan signal to the display panel, a level shifter configured to generate gate control signals to drive the scan driver, a power supply configured to supply a voltage to the level shifter, and a timing controller configured to control the level shifter, wherein the level shifter includes a level shifter output setting circuit implemented so that at least one output channel is selected based on transmission signals supplied from the timing controller and an output state of the selected output channel is selected as a high voltage or a low voltage.

According to one or more aspects of the present disclosure, the level shifter output setting circuit can select the at least one output channel in response to a first bit value included in the transmission signals, and select an output state of the selected output channel in response to a second bit value included in the transmission signals as the high voltage or the low voltage.

According to one or more of the present disclosure, the level shifter output setting circuit can modulate a level of the high voltage or the low voltage in response to a third bit value included in the transmission signals.

According to one or more aspects of the present disclosure, the level shifter output setting circuit can include a state value setter configured to set an output state of the selected output channel based on a first part of the transmission signals, a state value storage configured to temporarily store a state value set in the state value setter based on a second part of the transmission signals in a storage prepared therein, a driving circuit configured to generate a driving signal based on the state value stored in the state value storage, and an output circuit configured to operate based on the driving signal generated from the driving circuit and to output the high voltage or the low voltage based on a gate high voltage and a gate low voltage supplied from the power supply.

According aspects of the present disclosure, the state value setter can include state value setting switches turned on in response to a channel selection signal among the transmission signals, and state value setting capacitors configured to store a high state value or a low state value in response to a channel state setting signal among the transmission signals.

According to one or more aspects of the present disclosure, the state value storage can include first state value storage switches turned on in response to a first control signal among the transmission signals, first state value storage capacitors configured to store state values stored in the state value setting capacitors in response to switching operations of the first state value storage switches, second state value storage switches turned on in response to a second control signal among the transmission signals, and second state value storage capacitors configured to latch the state values stored in the first state value storage capacitors in response to switching operations of the second state value storage switches.

In another aspect of the present disclosure, a level shifter includes a reception circuit configured to receive transmission signals transmitted from outside, and a level shifter output setting circuit implemented so that at least one output channel is selected based on the transmission signals and an output state of the selected output channel is selected as a high voltage or a low voltage.

According to one or more aspects of the present disclosure, the level shifter output setting circuit can include a state value setter configured to set an output state of the selected output channel based on a first part of the transmission signals, a state value storage configured to temporarily store a state value set in the state value setter based on a second part of the transmission signals in a storage prepared therein, a driving circuit configured to generate a driving signal based on the state value stored in the state value storage, and an output circuit configured to operate based on the driving signal generated from the driving circuit and output the high voltage or the low voltage based on a gate high voltage and a gate low voltage supplied from outside.

According to one or more aspects of the present disclosure, the level shifter output setting circuit can select the at least one output channel in response to a first bit value included in the transmission signals, and select an output state of the selected output channel in response to a second bit value included in the transmission signals as the high voltage or the low voltage.

According to one or more aspects of the present disclosure, the level shifter output setting circuit can modulate a level of the high voltage or the low voltage in response to a third bit value included in the transmission signals.

It is to be understood that both the foregoing general description and the following detailed description of various aspects of the present disclosure are examples and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE EMBODIMENTS

Reference will now be made in detail to the example embodiments of the present disclosure, examples of which are illustrated in the accompanying drawings. Wherever possible, the same reference numbers will be used throughout the drawings to refer to the same or like parts.

A display device according to the present disclosure can be implemented as a television, a video player, a personal computer (PC), a home theater, an automotive electric device, or a smartphone, but is not limited thereto. The display device according to the present disclosure can be implemented as an LED device, a QDD, or an LCD. For convenience of description, an LED device that directly emits light based on an inorganic light-emitting diode or an organic light-emitting diode will hereinafter be taken as an example.

In addition, a thin film transistor (TFT) described below can be implemented as an n-type TFT, as a p-type TFT, or in a form in which n-type and p-type are present together. The TFT is a three-electrode element including a gate, a source, and a drain. The source is an electrode that supplies a carrier to a transistor. In the TFT, a carrier starts flowing from the source. The drain is an electrode through which a carrier exits the TFT. That is, in the TFT, a carrier flows from the source to the drain.

In the case of the p-type TFT, since the carrier is a hole, a source voltage is higher than a drain voltage so that the hole can flow from the source to the drain. In the p-type TFT, a hole flows from the source to the drain side, and thus current flows from the source to the drain side. In contrast, in the case of the n-type TFT, since an electron is a carrier, the source voltage is lower than the drain voltage so that an electron can flow from the source to the drain. In the n-type TFT, an electron flows from the source to the drain side, and thus current flows from the drain to the source side. However, the source and the drain of the TFT can be changed depending on the applied voltage. Reflecting this, in the following description, one of the source and drain will be described as a first electrode, and the other of the source and drain will be described as a second electrode.

Features of various embodiments of the present disclosure can be partially or entirely coupled to or combined with each other and can be operated, linked, or driven together in various ways. Embodiments of the present disclosure can be carried out independently from each other, or can be carried out together in co-dependent or related relationship. Further, the term “can” encompasses all the meanings and coverages of the term “may.” The term “disclosure” is interchangeably used with, or encompasses all the meanings and coverages of, the term “invention.”

All the components of each device or apparatus according to all embodiments of the present disclosure are operatively coupled and configured.

Figure 1:
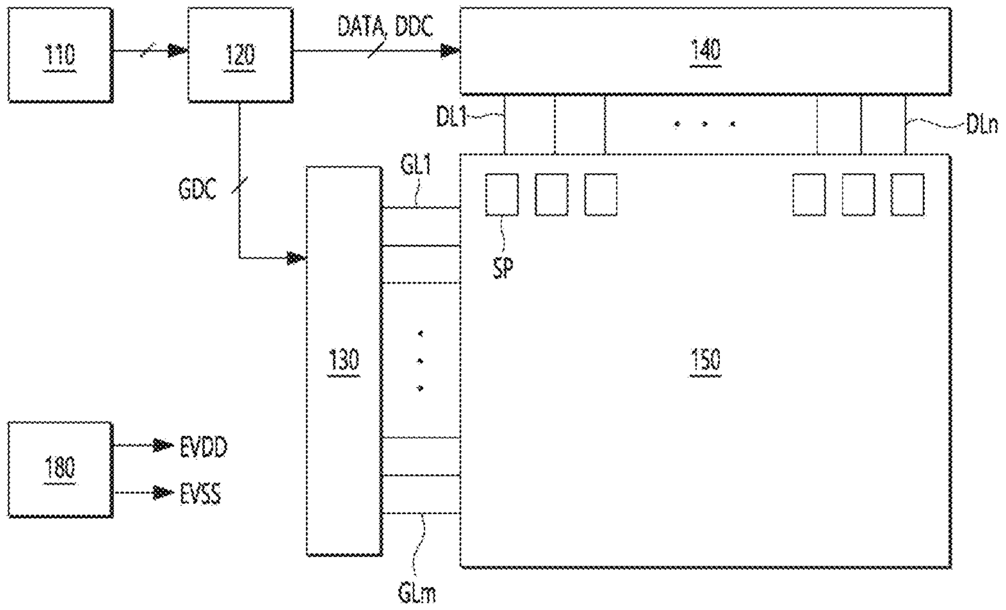
FIG. 1 is a block diagram schematically illustrating a light emitting diode (LED) device according to one or more embodiments of the present disclosure.
Figure 2:
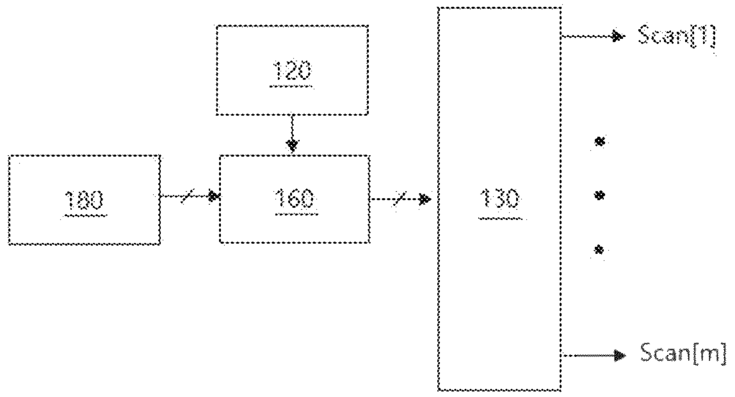
FIGS. 2 and 3 are diagrams for describing a configuration of a gate-in-panel (GIP)-type scan driver according to one or more embodiments of the present disclosure.
Figure 3:
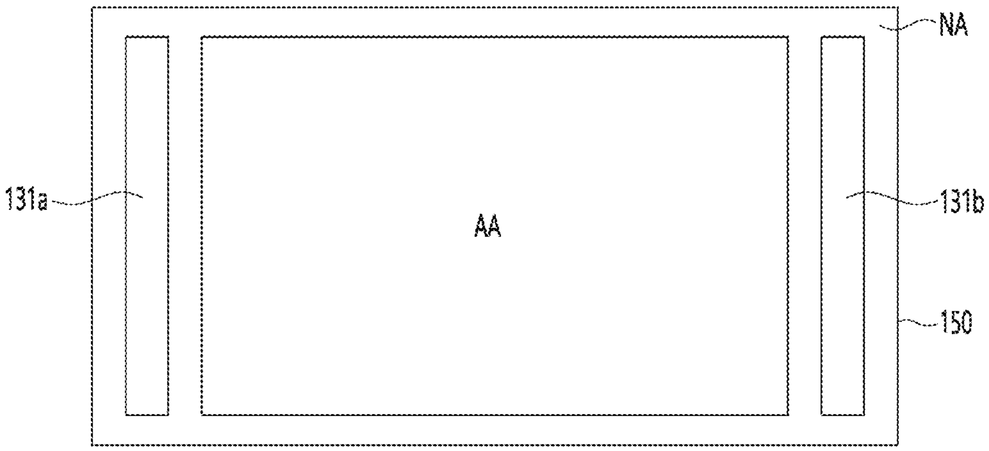
Figure 4:
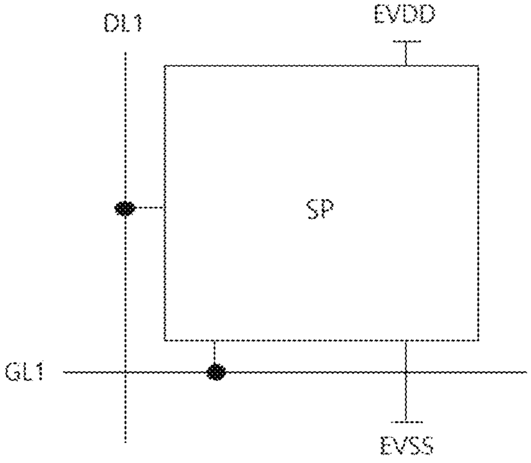
FIG. 4 shows an example diagram of a subpixel according to one or more embodiments of the present disclosure.

FIG. 1 is a block diagram schematically illustrating an LED device according to one or more embodiments of the present disclosure, FIGS. 2 and 3 are diagrams for describing a configuration of a GIP-type scan driver according to one or more embodiments of the present disclosure, and FIG. 4 an example diagram of a subpixel according to one or more embodiments of the present disclosure.

As illustrated in FIGS. 1 to 4, the LED device can include an image supply 110, a timing controller 120, a scan driver 130, a data driver 140, a display panel 150, a power supply 180, etc.

The image supply (set or host system) 110 can output various driving signals together with an externally-supplied image data signal or an image data signal stored in an internal memory. The image supply 110 can supply the data signal and the various driving signals to the timing controller 120.

The timing controller 120 can output a gate timing control signal GDC for control of operation timing of the scan driver 130, a data timing control signal DDC for control of operation timing of the data driver 140, various synchronization signals (a vertical synchronization signal Vsync and a horizontal synchronization signal $H_{SYNC}$), etc. The timing controller 120 can supply a data signal DATA supplied from the image supply 110 together with the data timing control signal DDC to the data driver 140. The timing controller 120 can take the form of an integrated circuit (IC) and be mounted on a printed circuit board, but is not limited thereto.

The scan driver 130 can output a scan signal (or scan voltage) in response to the gate timing control signal GDC supplied from the timing controller 120. The scan driver 130 can supply the scan signal to each of subpixels included in the display panel 150 through gate lines GL1 to GLm, where m is a real number. The scan driver 130 can take the form of an IC or can be formed directly on the display panel 150 in a GIP manner, but is not limited thereto. However, hereinafter, for convenience of description, a GIP-type scan driver will be described as an example as in FIGS. 2 and 3.

As illustrated in FIGS. 2 and 3, the GIP-type scan driver 130 includes shift registers 130*a* and 130*b* formed using a GIP method on one side and the other side of a non-active area NA of the display panel 150. The shift registers 130*a* and 130*b* can be formed in a thin film form on the non-active area NA of the display panel 150 using the GIP method. The GIP-type scan driver 130 can output scan signals (Scan[1] to Scan[m]) that can turn on or turn off transistors formed in the active area AA of the display panel 150.

The GIP-type scan driver 130 can operate based on signals and voltages output from the timing controller 120, the power supply 180, and the level shifter 160. The level shifter 160 can generate gate control signals necessary for driving the GIP-type scan drivers 130, 130*a*, and 130*b* based on the signals and voltages output from the timing controller 120 and the power supply 180.

The data driver 140 can sample and latch the data signal DATA in response to the data timing control signal DDC supplied from the timing controller 120, convert the resulting digital data signal into an analog data voltage based on a gamma reference voltage, and output the converted analog data voltage. The data driver 140 can supply data voltages to the subpixels included in the display panel 150 through data lines DL1 to DLn, where n is a real number. The data driver 140 can take the form of an IC and be mounted on the display panel 150 or on the printed circuit board, but is not limited thereto.

The power supply 180 can generate a high-potential voltage and a low-potential voltage based on an external input voltage supplied from the outside and output the high-potential voltage and the low-potential voltage through a high-potential voltage line EVDD and a low-potential voltage line EVSS. The power supply 180 can generate and output not only the high-potential voltage and the low-potential voltage, but also a voltage (for example, a gate high potential and a gate low voltage) required to drive the scan driver 130 or a voltage (for example, a drain voltage and a half drain voltage) required to drive the data driver 140.

The display panel 150 can be manufactured based on a rigid or flexible substrate of glass, silicon, polyimide, etc. The display panel 150 can include a plurality of subpixels SP for displaying an image based on a scan signal, a driving signal including a data voltage, a high-potential voltage, a low-potential voltage, etc. As illustrated in FIG. 4, the subpixels SP can be connected to the first data line DL1, the first gate line GL1, the high-potential voltage line EVDD, and the low-potential voltage line EVSS. The subpixels SP can directly emit light. A subpixel SP can emit light of one of colors of red, green, blue, white, etc.

Meanwhile, the timing controller 120, the scan driver 130, the data driver 140, etc., have been described above as having individual configurations. However, one or more of the timing controller 120, the scan driver 130, and the data driver 140 can be integrated into one IC depending on the implementation scheme of the LED device.

Figure 5:
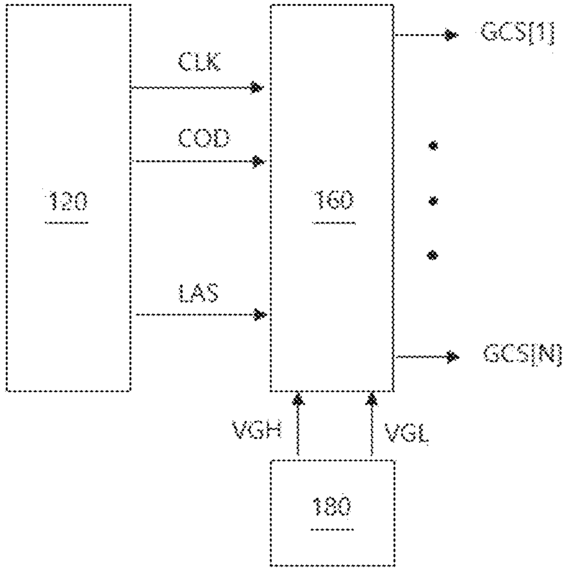
FIG. 5 is a block diagram for describing a level shifter and a surrounding configuration thereof according to a first embodiment of the present disclosure.
Figure 6:
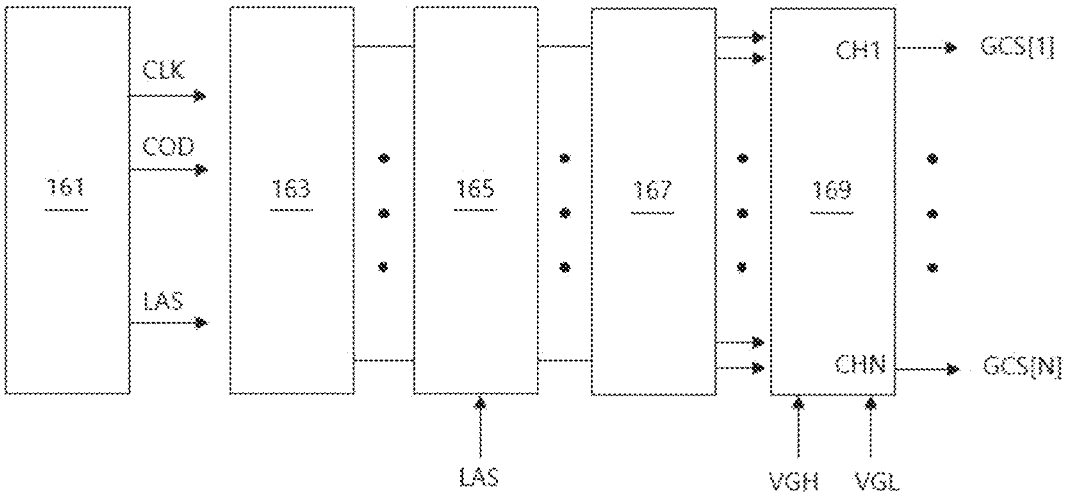
FIG. 6 is an example block configuration diagram of the level shifter according to the first embodiment.
Figure 7:
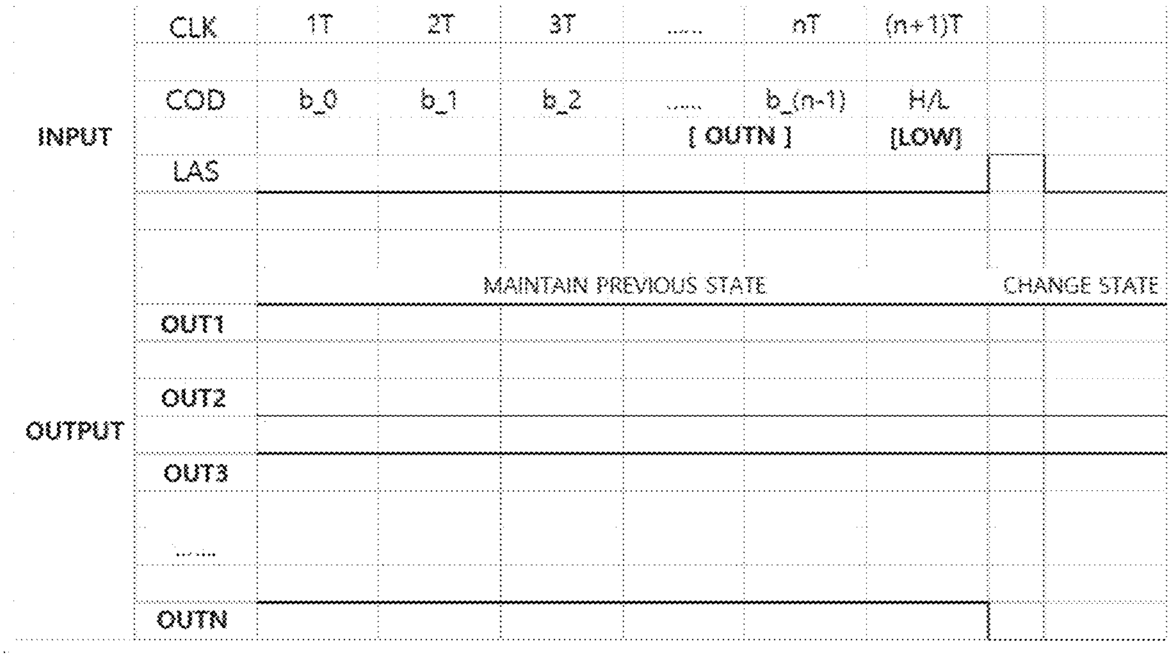
FIG. 7 is a waveform diagram for describing input/output characteristics of the level shifter according to the first embodiment.

FIG. 5 is a block diagram for describing a level shifter and a surrounding configuration thereof according to a first embodiment of the present disclosure, FIG. 6 is an example block configuration diagram of the level shifter according to the first embodiment, and FIG. 7 is a waveform diagram for describing input/output characteristics of the level shifter according to the first embodiment.

As illustrated in FIG. 5, the level shifter 160 according to the first embodiment operates based on transmission signals CLK, COD, and LAS supplied from the timing controller 120 and voltages VGH and VGL supplied from the power supply 180, and can output gate control signals GCS[1] to GCS[N]. Here, N, which defines the number of gate control signals GCS[1] to GCS[N], and m, which defines the number of scan signals Scan[1] to Scan[m], can each be defined as an integer of 2 or more, and the two values can be the same or different.

An interface environment for transmission and reception of the transmission signals CLK, COD, and LAS is provided between the timing controller 120 and the level shifter 160. For example, the timing controller 120 and the level shifter 160 can transmit and receive the transmission signals CLK, COD, and LAS based on serial communication. The timing controller 120 can encode some of the transmission signals CLK, COD, and LAS. An interface environment for transmission and reception of the voltages VGH and VGL is provided between the power supply 180 and the level shifter 160. For example, the power supply 180 and the level shifter 160 can transmit and receive the voltages VGH and VGL based on power wiring.

Meanwhile, the gate control signals GCS[1] to GCS[N] can include signals for controlling operation of the scan driver 130, for example, clock signals. The scan driver operates based on the gate control signals GCS[1] to GCS [N], including clock signals output from the level shifter 160, and the voltages VGH and VGL output from the power supply 180, and can output scan signals.

As illustrated in FIG. 6, the level shifter 160 according to the first embodiment can include a reception circuit 161, a state value setter 163, a state value storage 165, a driving circuit 167, and an output circuit 169. The state value setter 163, the state value storage 165, the driving circuit 167, and the output circuit 169 can be defined as a level shifter output setting circuit.

The reception circuit 161 can perform a function of receiving transmission signals CLK, COD, and LAS supplied from the timing controller and transmitting the transmission signals to devices included in the level shifter 160.

The state value setter 163 can perform a function of setting a state value capable of setting (changing) a state of an output channel of the level shifter 160 based on a first part of the transmission signals CLK, COD, and LAS transmitted from the reception circuit 161.

The state value storage 165 can perform a function of temporarily storing the state value set in the state value setter 163 in a storage provided therein. The state value storage 165 can perform an operation for temporarily storing the state value based on the signal LAS (based on a second part of the transmission signals) supplied from the timing controller.

The driving circuit 167 can perform a function of generating a driving signal (driving voltage) capable of controlling the output circuit 169 based on the state value stored in the state value storage 165.

The output circuit 169 operates based on the driving signal transmitted from the driving circuit 167 and can perform a level shift (or level conversion) function to output one of the voltages VGH and VGL provided from the power supply 180. The output circuit 169 can output the gate control signals GCS[1] to GCS[N] through a first channel CH1 to an Nth channel CHN.

As illustrated in FIGS. 6 and 7, in the level shifter 160 according to the first embodiment, one output channel can be selected in response to first bit values b_0 to b_(n−1) included in a selection data signal COD among the transmission signals CLK, COD, and LAS transmitted from the reception circuit 161. Meanwhile, note that, since the selection data signal COD is transmitted to the reception circuit 161 using serial communication, a configuration relationship is shown as an example together with a clock signal (CLK; 1T to (n+1) T each refer to the number of clock pulses generated on a time axis) among the transmission signals CLK, COD, and LAS. In addition, the level shifter 160 according to the first embodiment can change the state of the output channel in response to the signal LAS among the transmission signals CLK, COD, and LAS transmitted from the reception circuit 161.

As an example of an operation of the level shifter 160 according to the first embodiment, FIG. 7 illustrates that an Nth output channel OUTN is selected according to the first bit values b_0 to b_(n−1) included in the selection data signal COD, and a low voltage is output through the Nth output channel OUTN by a low state value L (LOW).

However, this is an example, and the level shifter 160 can select one of the first channel CH1 to the Nth channel CHN in response to the first bit values b_0 to b_(n−1) included in the selection data signal COD. In addition, the level shifter 160 can select the output state to output a high voltage or a low voltage in response to a second bit value H/L included in the selection data signal COD. In addition, the level shifter 160 can maintain previous states for unselected channels among the first channel CH1 to the Nth channel CHN.

As described above, when the number of output channels is N, the level shifter 160 according to the first embodiment can transmit $(\mathrm{Log}_2 N)+1$ data bits to specify an output channel and specify an output state thereof. For example, when the number of output channels is 32, the output channel whose voltage output state changes can be specified by receiving only 5 to 7 data bits from the timing controller. Therefore, the level shifter 160 according to the first embodiment can reduce the number of data bits for specifying an output channel when using the timing controller and a serial-parallel interface. In addition, when using the timing controller and the serial-parallel interface, the level shifter 160 according to the first embodiment can be implemented to use one bit capable of defining a high state value or a low state value to specify an output state of a selected output channel and utilize the others as an option. In addition, the level shifter 160 according to the first embodiment can shorten a data transmission and reception time by reducing the number of data bits when using the timing controller and the serial-parallel interface.

Figure 8:
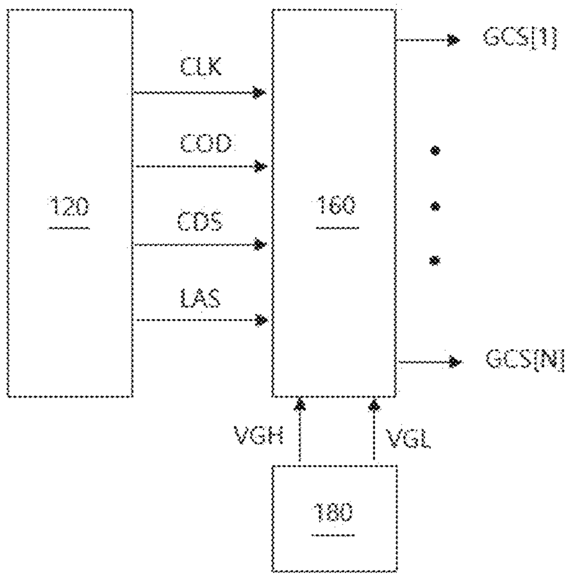
FIG. 8 is a block diagram for describing a level shifter and a surrounding configuration thereof according to a second embodiment of the present disclosure.
Figure 9:
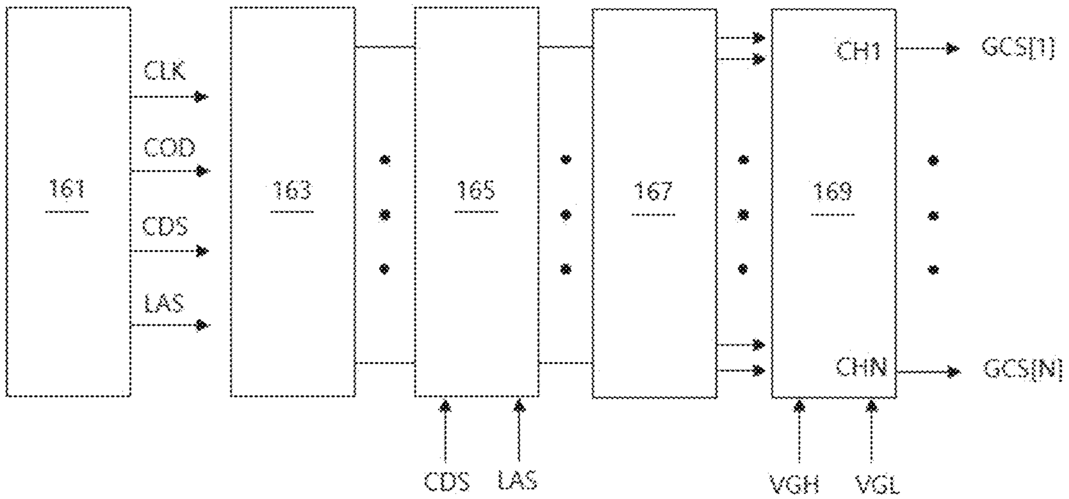
FIG. 9 is an example block configuration diagram of the level shifter according to the second embodiment.
Figure 10:
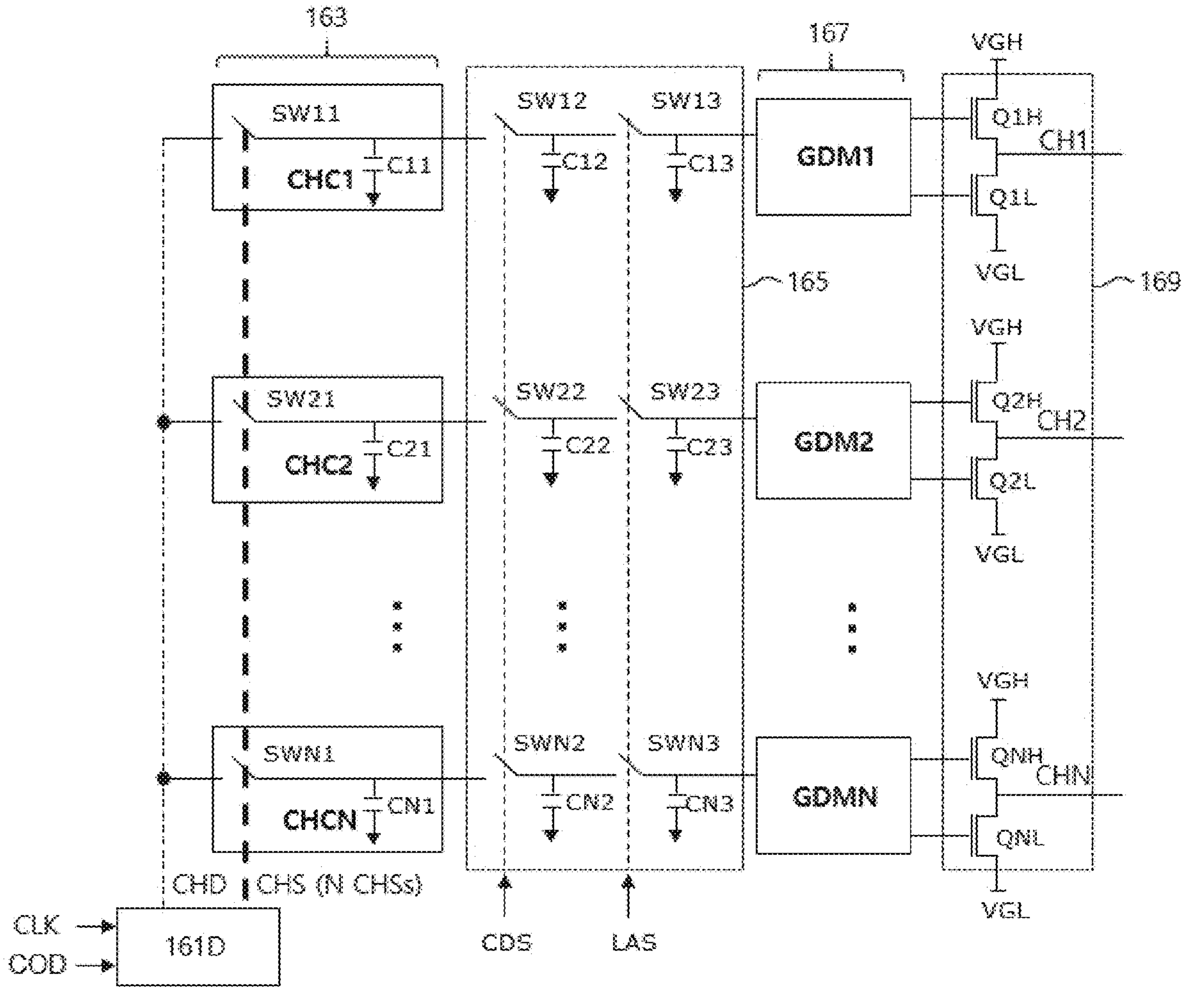
FIG. 10 is a detailed example configuration diagram of the level shifter according to the second embodiment.
Figure 11:
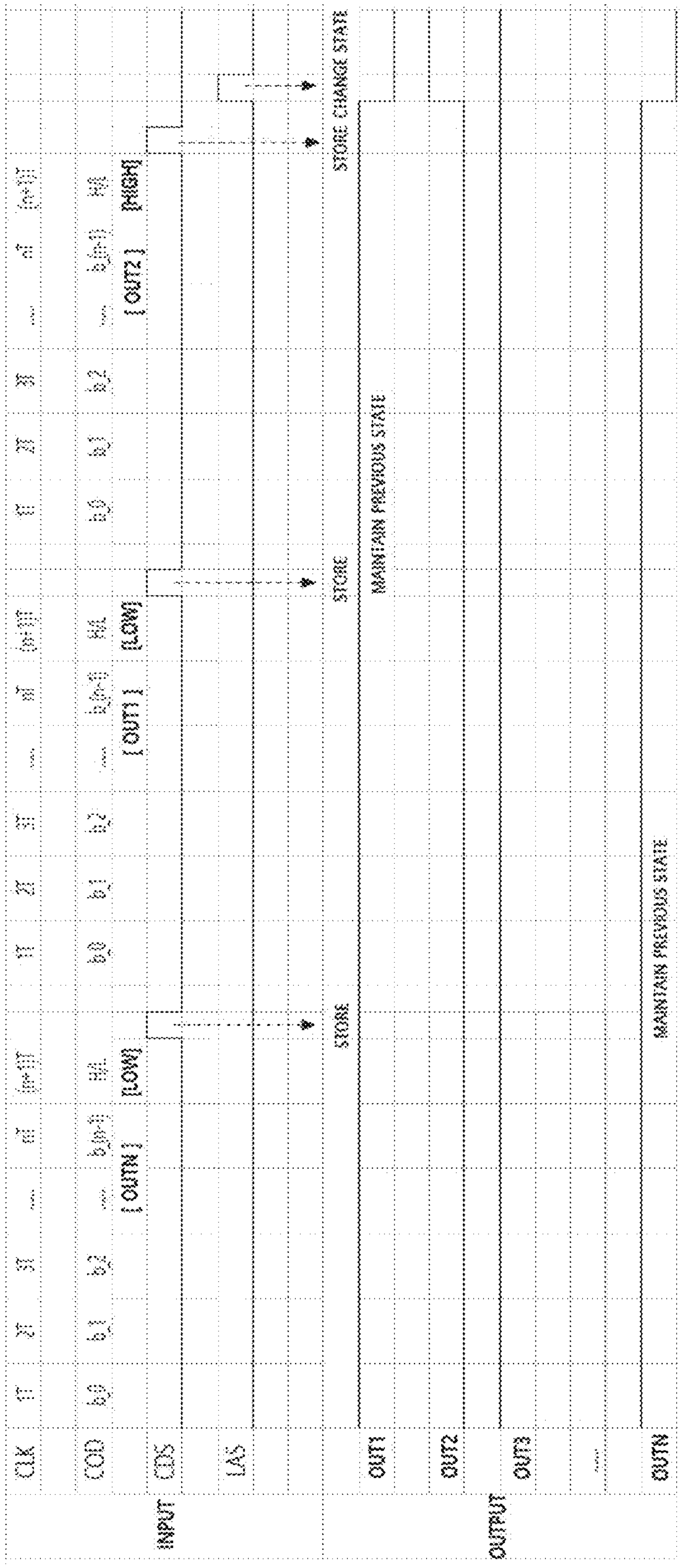
FIG. 11 is a waveform diagram for describing input/output characteristics of the level shifter according to the second embodiment.

FIG. 8 is a block diagram for describing a level shifter and a surrounding configuration thereof according to a second embodiment of the present disclosure, FIG. 9 is an example block configuration diagram of the level shifter according to the second embodiment, FIG. 10 is a detailed example configuration diagram of the level shifter according to the second embodiment, and FIG. 11 is a waveform diagram for describing input/output characteristics of the level shifter according to the second embodiment.

As illustrated in FIG. 8, the level shifter 160 according to the second embodiment operates based on transmission signals CLK, COD, CDS, and LAS supplied from the timing controller 120 and voltages VGH and VGH supplied from the power supply 180, and can output gate control signals GCS[1] to GCS[N].

An interface environment for transmission and reception of the transmission signals CLK, COD, CDS, and LAS is provided between the timing controller 120 and the level shifter 160. For example, the timing controller 120 and the level shifter 160 can transmit and receive the transmission signals CLK, COD, CDS, and LAS based on serial communication. The timing controller 120 can encode some of the transmission signals CLK, COD, CDS, and LAS. An interface environment for transmission and reception of the voltages VGH and VGL is provided between the power supply 180 and the level shifter 160. For example, the power supply 180 and the level shifter 160 can transmit and receive the voltages VGH and VGL based on power wiring.

As illustrated in FIG. 9, the level shifter 160 according to the second embodiment can include a reception circuit 161, a state value setter 163, a state value storage 165, a driving circuit 167, an output circuit 169, etc. The state value setter 163, the state value storage 165, the driving circuit 167, and the output circuit 169 can be defined as a level shifter output setting circuit.

The reception circuit 161 can perform a function of receiving the transmission signals CLK, COD, CDS, and LAS supplied from the timing controller and transmitting the transmission signals to devices included in the level shifter 160.

The state value setter 163 can perform a function of setting a state value capable of setting (changing) a state of an output channel of the level shifter 160 based on a first part of the transmission signals CLK, COD, CDS, and LAS transmitted from the reception circuit 161.

The state value storage 165 can perform a function of temporarily storing the state value set in the state value setter 163 in a storage provided therein and latching the state value. The state value storage 165 can perform an operation of temporarily storing the state value based on the signals CDS and LAS (based on a second part of the transmission signals) supplied from the timing controller and latching the state value.

The driving circuit 167 can perform a function of generating a driving signal (driving voltage) capable of controlling the output circuit 169 based on the state value stored in the state value storage 165.

The output circuit 169 operates based on the driving signal transmitted from the driving circuit 167 and can perform a level shift (or level conversion) function to output one of the voltages VGH and VGL provided from the power supply 180. The output circuit 169 can output the gate control signals GCS[1] to GCS[N] through the first channel CH1 to the Nth channel CHN.

As illustrated in FIG. 10, the reception circuit can include a decoder 161D. The decoder 161D can decode and output the selection data signal COD based on the clock signal CLK to drive the state value setter 163 in a parallel system.

The decoder 161D can decode the selection data signal COD based on the clock signal CLK to prepare N channel selection signals CHS and one channel state setting signal CHD, and supply the signals to the state value setter 163. The N channel selection signals CHS can correspond to the number of output channels of the level shifter.

The state value setter 163 can include state value setting switches SW11 to SWN1 and state value setting capacitors C11 to CN1. The state value setting switches SW11 to SWN1 can be turned on or off in response to the channel selection signal CHS supplied from the decoder 161D. The state value setting capacitors C11 to CN1 can be charged with a high state value or a low state value in response to the channel state setting signal CHD supplied from the decoder 161D. When the state value setting switches SW11 to SWN1 are turned on, the state value setting capacitors C11 to CN1 can be charged with a high state value or a low state value based on the channel state setting signal CHD.

The eleventh state value setting switch SW11 and the eleventh state value setting capacitor C11 can be defined as a first channel state value setter CHC1 in charge of the first output channel CH1 of the level shifter. A twenty-first state value setting switch SW21 and a twenty-first state value setting capacitor C21 can be defined as a second channel state value setter CHC2 in charge of the second output channel CH2 of the level shifter. An N1th state value setting switch SWN1 and an N1th state value setting capacitor CN1 can be defined as an Nth channel state value setter CHCN in charge of the Nth output channel CHN of the level shifter.

The state value storage 165 can include first state value storage switches SW12 to SWN2, second state value storage switches SW13 to SWN3, first state value storage capacitors C12 to CN2, and second state value storage capacitors C13 to CN3.

The first state value storage switches SW12 to SWN2 can be turned on or off in response to the first control signal CDS supplied from the reception circuit. The first state value storage capacitors C12 to CN2 can temporarily store the state values stored in the state value setter 163. When the first state value storage switches SW12 to SWN2 are turned on, the first state value storage capacitors C12 to CN2 can store the same state values as the state values stored in the state value setting capacitors C11 to CN1.

The second state value storage switches SW13 to SWN3 can be turned on or off in response to the second control signal LAS supplied from the reception circuit. The second state value storage capacitors C13 to CN3 can latch the state values stored in the first state value storage capacitors C12 to CN2. When the second state value storage switches SW13 to SWN3 are turned on, the second state value storage capacitors C13 to CN3 can latch the same state values as the state values stored in the first state value storage capacitors C12 to CN2.

When the state value storage 165 is separately configured as above, it is possible to not only select one output channel and change a state thereof in the level shifter, but also to select a plurality of output channels and change states thereof.

The twelfth state value storage switch SW12, the twelfth state value storage capacitor C12, the thirteenth state value storage switch SW13, and the thirteenth state value storage capacitor C13 can be defined as a first channel state value storage in charge of the first output channel CH1 of the level shifter. The twenty-second state value storage switch SW22, the twenty-second state value storage capacitor C22, the twenty-third state value storage switch SW23, and the twenty-third state value storage capacitor C23 can be defined as a second channel state value storage in charge of the second output channel CH2 of the level shifter. The N2th state value storage switch SWN2, the N2th state value storage capacitor CN2, the N3th state value storage switch SWN3, and the N3th state value storage capacitor CN3 can be defined as an Nth channel state value storage in charge of the Nth output channel CHN of the level shifter.

The driving circuit 167 can include a first driving circuit GDM1 to an Nth driving circuit GDMN. The first driving circuit GDM1 to the Nth driving circuit GDMN can each generate a driving signal in response to a state value latched in the state value storage 165. The first driving circuit GDM1 can be defined as a first channel driving circuit in charge of the first output channel CH1 of the level shifter. The second driving circuit GDM2 can be defined as a second channel driving circuit in charge of the second output channel CH2 of the level shifter. The Nth driving circuit GDMN can be defined as an Nth channel driving circuit in charge of the Nth output channel CHN of the level shifter.

The output circuit 169 can include high-side transistors Q1H to QNH and low-side transistors Q1L to QNL. The high-side transistors Q1H to QNH and the low-side transistors Q1L to QNL can be made of an n-type TFT, a p-type TFT, or a combination of an n-type and a p-type TFT. However, in the present disclosure, the case where n-type TFTs are selected as the high-side transistors Q1H to QNH and the low-side transistors Q1L to QNL is described as an example.

The high-side transistors Q1H to QNH and the low-side transistors Q1L to QNL can output a gate high voltage VGH or a gate low voltage VGL in response to the driving signal output from the driving circuit 167. When the high-side transistors Q1H to QNH are turned on, the gate high voltage VGH can be output, and when the low-side transistors Q1L to QNL are turned on, the gate low voltage VGL can be output. For example, the high-side transistor Q1H and the low-side transistor Q1L included in the first output channel of the output circuit 169 can be separately turned on. To this end, the first driving circuit GDM1 can apply a control signal whose high-voltage level section does not overlap to the high-side transistor Q1H and the low-side transistor Q1L.

A first high-side transistor Q1H and a first low-side transistor Q1L can be defined as a first channel output circuit in charge of the first output channel CH1 of the level shifter. A second high-side transistor Q2H and a second low-side transistor Q2L can be defined as a second channel output circuit in charge of the second output channel CH2 of the level shifter. An Nth high-side transistor QNH and an Nth low-side transistor QNL can be defined as an Nth channel output circuit in charge of the Nth output channel CHN of the level shifter.

As illustrated in FIGS. 9 to 11, the level shifter 160 according to the second embodiment can select at least two output channels corresponding to the first bit values b_0 to b_(n−1) included in the selection data signal COD among the transmission signals CLK, COD, CDS, and LAS transmitted from the reception circuit 161. Meanwhile, note that, since the selection data signal COD is transmitted to the reception circuit 161 using serial communication, a configuration relationship is shown as an example together with a clock signal (CLK; 1T to (n+1) T each refer to the number of clock pulses generated on a time axis) among the transmission signals CLK, COD, CDS, and LAS. In addition, the level shifter 160 according to the second embodiment can select an output channel in response to a first control signal CDS among the transmission signals CLK, COD, CDS, and LAS transmitted from the reception circuit 161. In addition, the level shifter 160 according to the second embodiment can change the state of the output channel in response to a second control signal LAS among the transmission signals CLK, COD, CDS, and LAS transmitted from the reception circuit 161.

As an example of the operation of the level shifter 160 according to the second embodiment, FIG. 11 illustrates an example in which an Nth output channel OUTN, a second output channel OUT2, and a first output channel OUT1 are selected by the first bit values b_0 to b_(n−1) included in the selection data signal COD. In addition, as an example of the operation of the level shifter 160 according to the second embodiment, FIG. 11 illustrates an example in which a low voltage is output through the Nth output channel OUTN and the first output channel OUT1 by a low state value L (LOW), and a high voltage is output through the second output channel OUT2 by a high state value H (HIGH).

However, the level shifter 160 according to the second embodiment can select a plurality of channels among the first channel CH1 to the Nth channel CHN in response to the first bit values b_0 to b_(n−1) included in the selection data signal COD. In addition, the level shifter 160 according to the second embodiment can output a high voltage or a low voltage in response to a second bit value (or state value) (H/L) included in the selection data signal COD. In addition, the level shifter 160 according to the second embodiment can maintain previous states of unselected channels among the first channel CH1 to the Nth channel CHN.

Further from the first embodiment, the level shifter 160 according to the second embodiment can specify a plurality of output channels and specify output states thereof at the same time. In addition, the level shifter 160 according to the second embodiment can sequentially or randomly specify output channels and randomly specify output states thereof.

Meanwhile, the level shifter 160 can be configured to modulate a level of a voltage output through an output channel based on a specific voltage, which will be described in a third embodiment below. However, since the overall configuration of the level shifter 160 is similar to that of the second embodiment, the description will focus on an added configuration for convenience of description.

Figure 12:
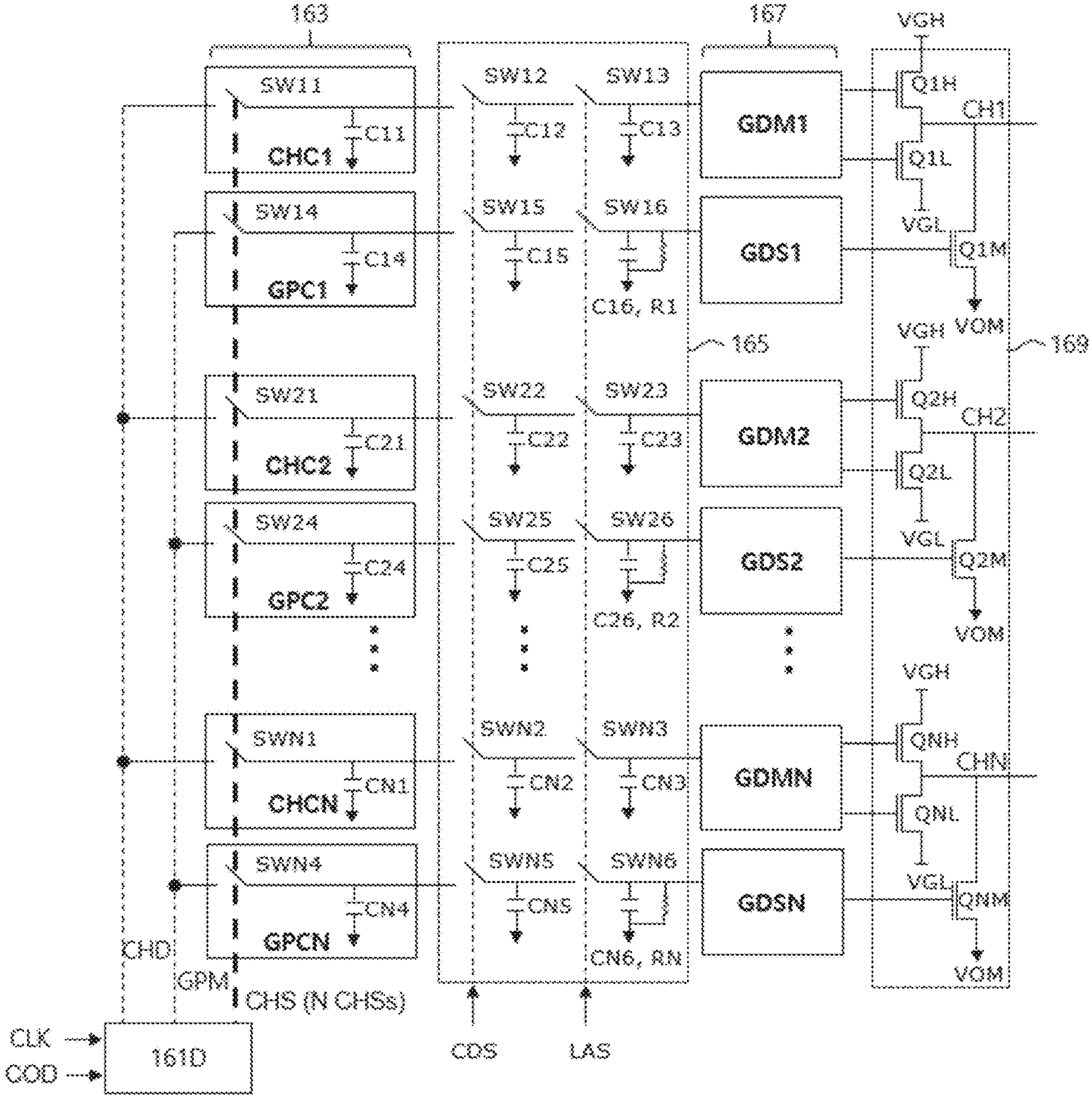
FIG. 12 is a detailed configuration diagram of a level shifter according to a third embodiment of the present disclosure.
Figure 13:
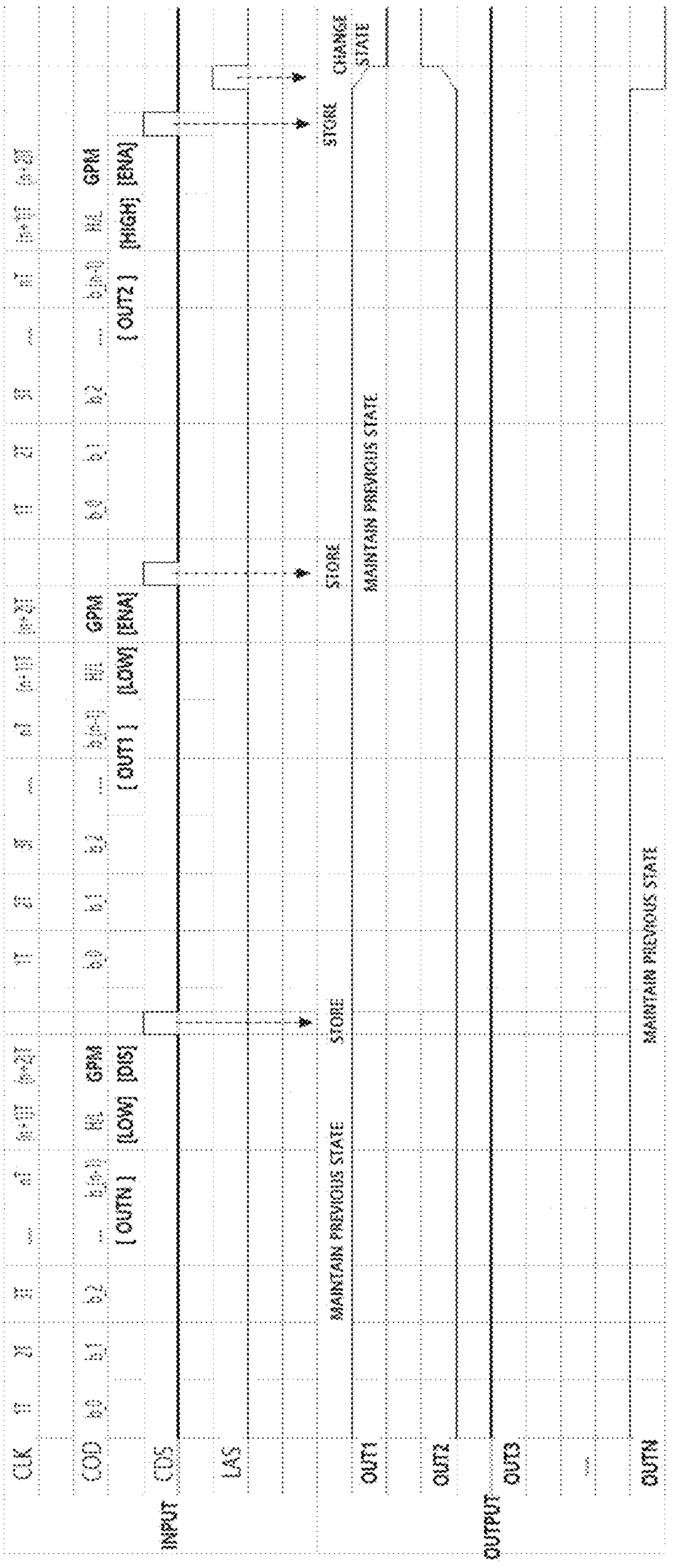
FIG. 13 is a waveform diagram for describing input/output characteristics of the level shifter according to the third embodiment.

FIG. 12 is a detailed configuration diagram of a level shifter according to the third embodiment, and FIG. 13 is a waveform diagram for describing input/output characteristics of the level shifter according to the third embodiment.

As illustrated in FIG. 12, the decoder 161D can decode and output the selection data signal COD based on the clock signal CLK to drive the state value setter 163 in a parallel system.

The decoder 161D can decode the selection data signal COD based on the clock signal CLK to prepare N channel selection signals CHS, one channel state setting signal CHD, and one channel modulation signal GPM, and supply these signals to the state value setter 163. Here, the N channel selection signals CHS can correspond to the total number of output channels of the level shifter.

The state value setter 163 can include first state value setting switches SW11 to SWN1, first state value setting capacitors C11 to CN1, second state value setting switches SW14 to SWN4, and second state value setting capacitors C14 to CN4. The first state value setting switches SW11 to SWN1 can be turned on or turned off in response to the channel selection signal CHS supplied from the decoder 161D. The first state value setting capacitors C11 to CN1 can be charged with a high state value or a low state value in response to the channel state setting signal CHD supplied from the decoder 161D. When the first state value setting switches SW11 to SWN1 are turned on, the first state value setting capacitors C11 to CN1 can be charged with a high state value or a low state value based on the channel state setting signal CHD.

The second state value setting switches SW14 to SWN4 can be turned on or turned off in response to the channel selection signal CHS supplied from the decoder 161D. The second state value setting capacitors C14 to CN4 can be charged with a high state value or a low state value in response to the channel modulation signal GPM supplied from the decoder 161D. When the second state value setting switches SW14 to SWN4 are turned on, the second state value setting capacitors C14 to CN4 can be charged to a high state value or a low state value based on the channel modulation signal GPM.

The eleventh state value setting switch SW11 and the eleventh state value setting capacitor C11 can be defined as a first channel state value setter CHC1 in charge of the first output channel CH1 of the level shifter. The fourteenth state value setting switch SW14 and the fourteenth state value setting capacitor C14 can be defined as a first channel modulation value setter GPC1 in charge of the first output channel CH1 of the level shifter. The twenty-first state value setting switch SW21 and the twenty-first state value setting capacitor C21 can be defined as a second channel state value setter CHC2 in charge of the second output channel CH2 of the level shifter. The twenty-fourth state value setting switch SW24 and the twenty-fourth state value setting capacitor C24 can be defined as a second channel modulation value setter GPC2 in charge of the second output channel CH2 of the level shifter. The N1th state value setting switch SWN1 and the N1th state value setting capacitor CN1 can be defined as an Nth channel state value setter CHCN in charge of the Nth output channel CHN of the level shifter. The N4th state value setting switch SWN4 and the N4th state value setting capacitor CN4 can be defined as an Nth channel modulation value setter GPCN in charge of the Nth output channel CHN of the level shifter.

The state value storage 165 can include the first state value storage switches SW12 to SWN2, the second state value storage switches SW13 to SWN3, third state value storage switches SW15 to SWN5, fourth state value storage switches SW16 to SWN6, the first state value storage capacitors C12 to CN2, the second state value storage capacitors C13 to CN3, third state value storage capacitors C15 to CN5, fourth state value storage capacitors C16 to CN6, and resistors R1 to RN.

The first state value storage switches SW12 to SWN2 can be turned on or turned off in response to the first control signal CDS supplied from the reception circuit. The first state value storage capacitors C12 to CN2 can temporarily store the state values stored in the state value setter 163. When the first state value storage switches SW12 to SWN2 are turned on, the first state value storage capacitors C12 to CN2 can store the same state values as the state values stored in the first state value setting capacitors C11 to CN1.

The second state value storage switches SW13 to SWN3 can be turned on or turned off in response to the second control signal LAS supplied from the reception circuit. The second state value storage capacitors C13 to CN3 can latch the state values stored in the first state value storage capacitors C12 to CN2. When the second state value storage switches SW13 to SWN3 are turned on, the second state value storage capacitors C13 to CN3 can latch the same state values as the state values stored in the first state value storage capacitors C12 to CN2.

The third state value storage switches SW15 to SWN5 can be turned on or turned off in response to the first control signal CDS supplied from the reception circuit. The third state value storage capacitors C15 to CN5 can temporarily store the state values stored in the state value setter 163. When the third state value storage switches SW15 to SWN5 are turned on, the third state value storage capacitors C15 to CN5 have the same state values as the state values stored in the second state value setting capacitors C14 to CN4.

The fourth state value storage switches SW16 to SWN6 can be turned on or turned off in response to the second control signal LAS supplied from the reception circuit. The fourth state value storage capacitors C16 to CN6 can latch the state values stored in the third state value storage capacitors C15 to CN5. When the fourth state value storage switches SW16 to SWN6 are turned on, the fourth state value storage capacitors C16 to CN6 can latch the same state values as the state values stored in the third state value storage capacitors C15 to CN5.

One end and the other end of each the resistors R1 to RN can be connected to first and second electrodes of each of the fourth state value storage capacitors C16 to CN6. The resistors R1 to RN can discharge the state values stored in the fourth state value storage capacitors C16 to CN6.

When the state value storage 165 is configured as above, in addition to selecting one output channel and changing a state thereof in the level shifter, it is possible to select a plurality of output channels, change states thereof, and modulate (gate voltage modulation) a level of an output voltage.

The twelfth state value storage switch SW12, the twelfth state value storage capacitor C12, the thirteenth state value storage switch SW13, and the thirteenth state value storage capacitor C13 can be defined as a first channel state value storage in charge of the first output channel CH1 of the level shifter. The fifteenth state value storage switch SW15, the fifteenth state value storage capacitor C15, the sixteenth state value storage switch SW16, the sixteenth state value storage capacitor C16, and the first resistor R1 can be defined as a first channel modulation value storage and discharge unit in charge of the first output channel CH1 of the level shifter.

The twenty-second state value storage switch SW22, the twenty-second state value storage capacitor C22, the twenty-third state value storage switch SW23, and the twenty-third state value storage capacitor C23 can be defined as a second channel state value storage in charge of the second output channel CH2 of the level shifter. The twenty-fifth state value storage switch SW25, the twenty-fifth state value storage capacitor C25, the twenty-sixth state value storage switch SW26, the twenty-sixth state value storage capacitor C26, and the second resistor R2 can be defined as a second channel modulation value storage and discharge unit in charge of the second output channel CH2 of the level shifter.

The N2th state value storage switch SWN2, the N2th state value storage capacitor CN2, the N3th state value storage switch SWN3, and the N3th state value storage capacitor CN3 can be defined as an Nth channel state value storage in charge of the Nth output channel CHN of the level shifter. The N5th state value storage switch SWN5, the N5th state value storage capacitor CN5, the N6th state value storage switch SWN6, the N6th state value storage capacitor CN6, and the Nth resistor RN can be defined as an Nth channel modulation value storage and discharge unit in charge of the Nth output channel CHN of the level shifter.

The driving circuit 167 can include a first main driving circuit GDM1 to an Nth main driving circuit GDMN and a first sub-driving circuit GDS1 to an Nth sub-driving circuit GDSN. The first main driving circuit GDM1 to the Nth main driving circuit GDMN can generate main driving signals in response to state values latched in the state value storage 165. The first sub-driving circuit GDS1 to the Nth sub-driving circuit GDSN can generate sub-driving signals in response to state values latched in the state value storage 165.

The first main driving circuit GDM1 can be defined as a first channel driving circuit in charge of the first output channel CH1 of the level shifter. The second main driving circuit GDM2 can be defined as a second channel driving circuit in charge of the second output channel CH2 of the level shifter. The Nth main driving circuit GDMN can be defined as an Nth channel driving circuit in charge of the Nth output channel CHN of the level shifter.

The first sub-driving circuit GDS1 can be defined as a first channel modulation circuit in charge of whether to modulate a voltage level output from the first output channel CH1 of the level shifter. The second sub-driving circuit GDS2 can be defined as a second channel modulation circuit in charge of whether to modulate a voltage level output from the second output channel CH2 of the level shifter. The Nth sub-driving circuit GDSN can be defined as an Nth channel modulation circuit in charge of whether to modulate a voltage level output from the Nth output channel CHN of the level shifter.

The output circuit 169 can include high-side transistors Q1H to QNH, low-side transistors Q1L to QNL, and modulation transistors Q1M to QNM. The high-side transistors Q1H to QNH and the low-side transistors Q1L to QNL can each output a gate high voltage VGH or a gate low voltage VGL in response to a main driving signal output from the driving circuit 167. When the high-side transistors Q1H to QNH are turned on, the gate high voltage VGH can be output, and when the low-side transistors Q1L to QNL are turned on, the gate low voltage VGL can be output. The modulation transistors Q1M to QNM can modulate a level of the gate high voltage VGH or the gate low voltage VGL in response to a sub-driving signal output from the driving circuit 167. The modulation transistors Q1M to QNM can each modulate the level of the gate high voltage VGH or gate low voltage VGL based on a modulation voltage VOM, which provides a fixed voltage or a variable voltage.

The first high-side transistor G1H and the first low-side transistor Q1L can be defined as a first channel output circuit in charge of the first output channel CH1 of the level shifter. The first modulation transistor Q1M can be defined as a first channel output modulator in charge of modulation of a voltage output from the first output channel CH1 of the level shifter. The second high-side transistor Q2H and the second low-side transistor Q2L can be defined as a second channel output circuit in charge of the second output channel CH2 of the level shifter. The second modulation transistor Q2M can be defined as a second channel output modulator in charge of modulation of a voltage output from the second output channel CH2 of the level shifter. The Nth high-side transistor QNH and the Nth low-side transistor QNL can be defined as an Nth channel output circuit in charge of the Nth output channel CHN of the level shifter. The Nth modulation transistor QNM can be defined as an Nth channel output modulator in charge of modulation of a voltage output from the Nth output channel CHN of the level shifter.

As illustrated in FIGS. 12 and 13, the level shifter 160 according to the third embodiment can select at least two output channels in response to the first bit values b_0 to b_(n−1) included in the selection data signal COD among the transmission signals CLK, COD, CDS, and LAS transmitted from the reception circuit 161. Meanwhile, note that, since the selection data signal COD is transmitted to the reception circuit 161 using serial communication, a configuration relationship is shown as an example together with a clock signal (CLK; 1T to (n+1) T each refer to the number of clock pulses generated on a time axis) among the signals CLK, COD, CDS, and LAS. In addition, the level shifter 160 according to the third embodiment can modulate a level of an output voltage in response to the channel modulation signal GPM included in the selection data signal COD among the transmission signals CLK, COD, CDS, and LAS transmitted from the reception circuit 161. In addition, the level shifter 160 according to the third embodiment can select an output channel in response to the first control signal CDS among the transmission signals CLK, COD, CDS, and LAS transmitted from the reception circuit 161. In addition, the level shifter 160 according to the third embodiment can change the state of the output channel in response to the second control signal LAS among the transmission signals CLK, COD, CDS, and LAS transmitted from the reception circuit 161.

As an example of the operation of the level shifter 160 according to the third embodiment, FIG. 13 illustrates an example in which the Nth output channel OUTN, the second output channel OUT2, and the first output channel OUT1 are selected by the first bit values b_0 to b_(n−1) included in the selection data signal COD. In addition, as an example of the operation of the level shifter 160 according to the second embodiment, FIG. 13 illustrates an example in which a low voltage is output through the Nth output channel OUTN and the first output channel OUT1 by a low state value L (LOW), and a high voltage is output through the second output channel OUT2 by a high state value H (HIGH). In addition, as an example of the operation of the level shifter 160 according to the third embodiment, FIG. 13 illustrates an example in which activation (EVA) is performed so that levels of voltages output through the first output channel OUT1 and the second output channel OUT2 are modulated by the channel modulation signal GPM, and deactivation (DIS) is performed so that a level of a voltage output through the Nth output channel OUTN is not modulated.

However, the level shifter 160 according to the third embodiment can select a plurality of channels among the first channel CH1 to the Nth channel CHN in response to the first bit values b_0 to b_(n−1) included in the selection data signal COD. In addition, the level shifter 160 according to the third embodiment can output a high voltage or a low voltage in response to a second bit value (or state value) H/L included in the selection data signal COD. In addition, the level shifter 160 according to the third embodiment can modulate a level of the high voltage or the low voltage in response to a third bit value (or modulation signal value) GPM included in the selection data signal COD. In addition, the level shifter 160 according to the third embodiment can maintain previous states of unselected channels among the first channel CH1 to the Nth channel CHN.

Further from the first embodiment or the second embodiment, the level shifter 160 according to the third embodiment can easily specify an output channel and an output state and easily modulate a level of an output voltage (gate voltage modulation). Meanwhile, the third embodiment illustrates, as an example, a circuit capable of modulating the level of the output voltage (gate voltage modulation) based on the second embodiment. However, the circuit can be implemented based on the first embodiment.

Hereinafter, examples that aid in understanding the operation of the level shifter will be described based on the third embodiment among the embodiments described above.

Figure 14:
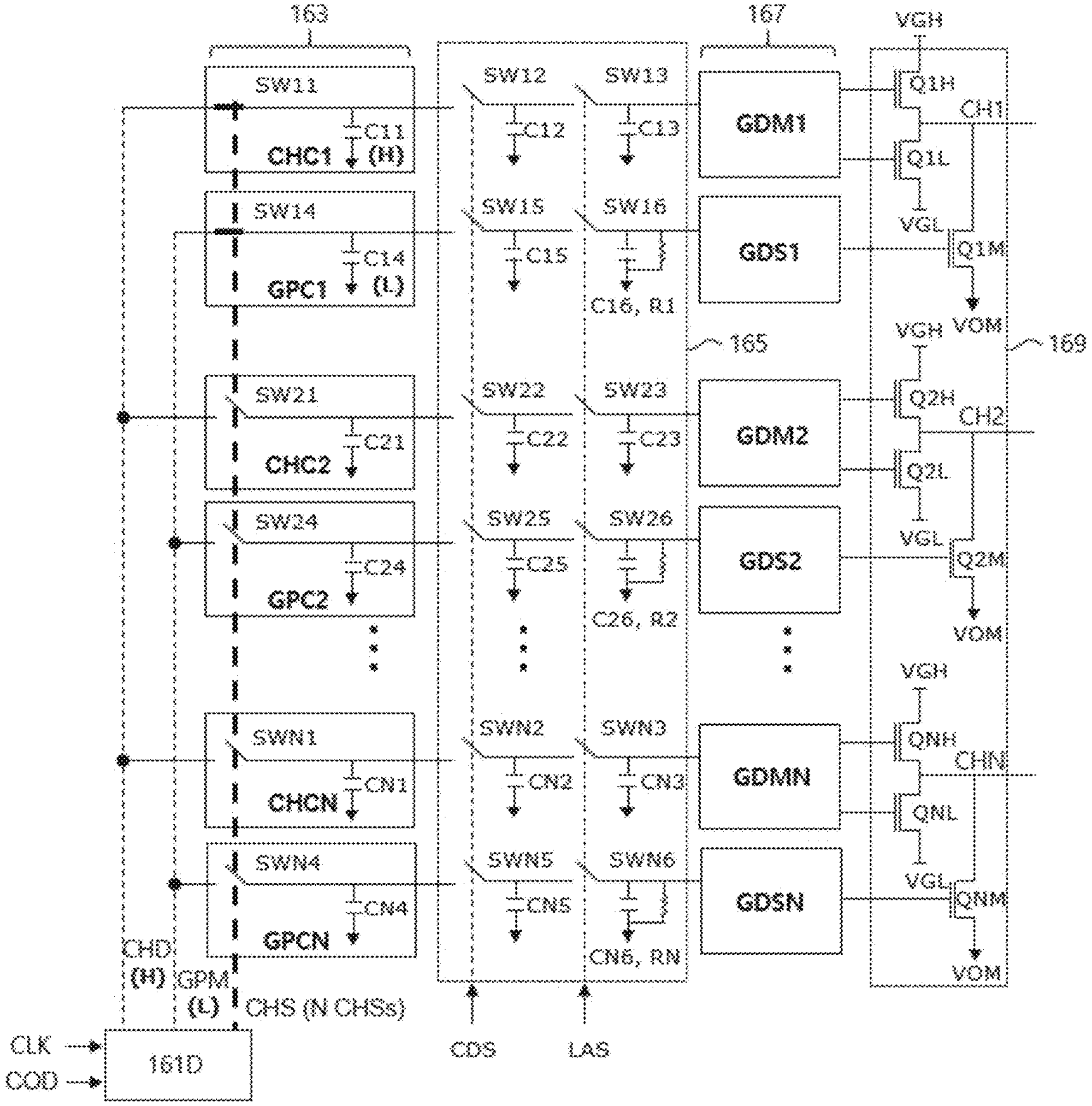
FIGS. 14 to 16 are first operation state diagrams that aid in understanding of the operation of the level shifter based on the third embodiment.
Figure 15:
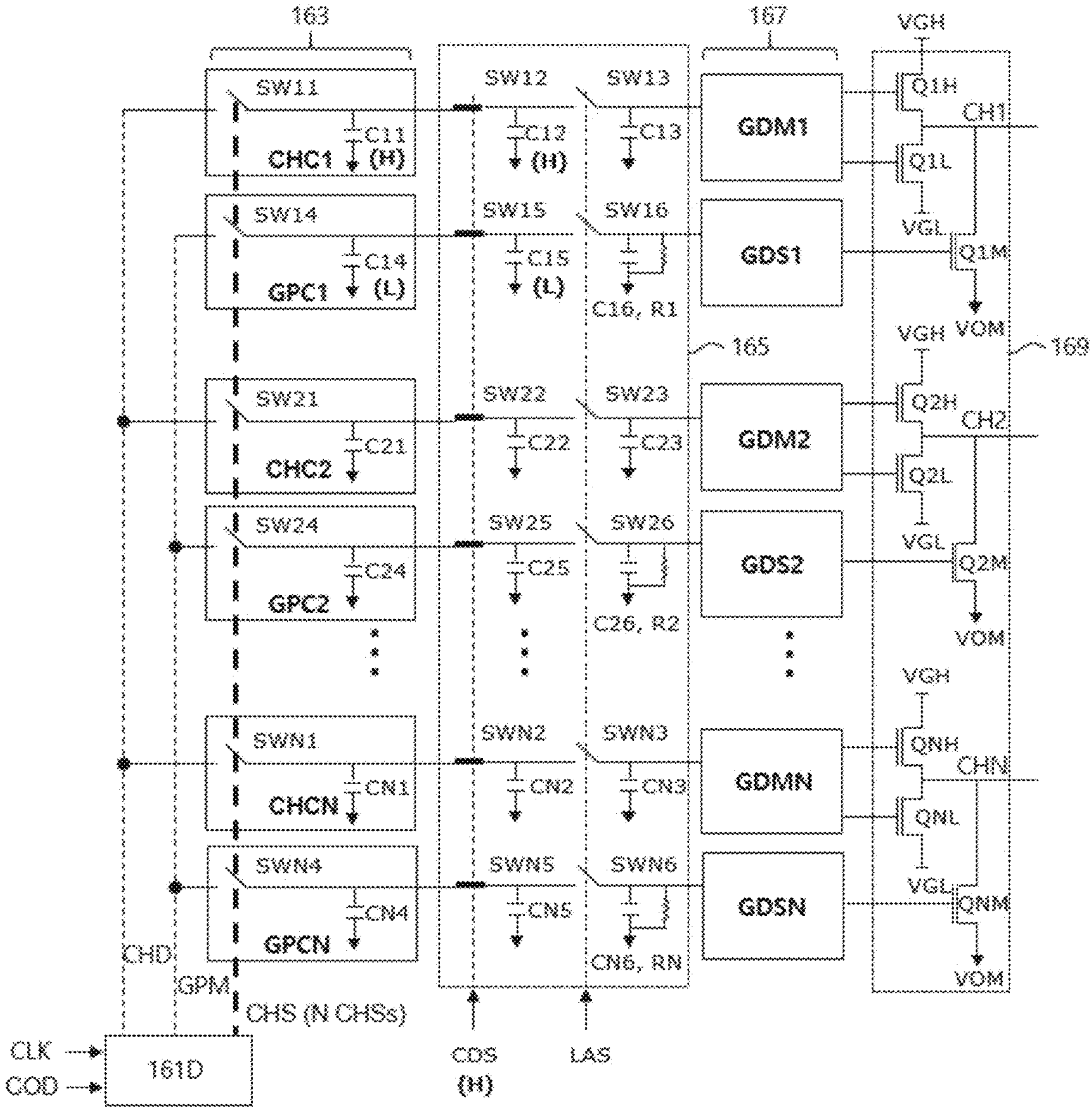
Figure 16:
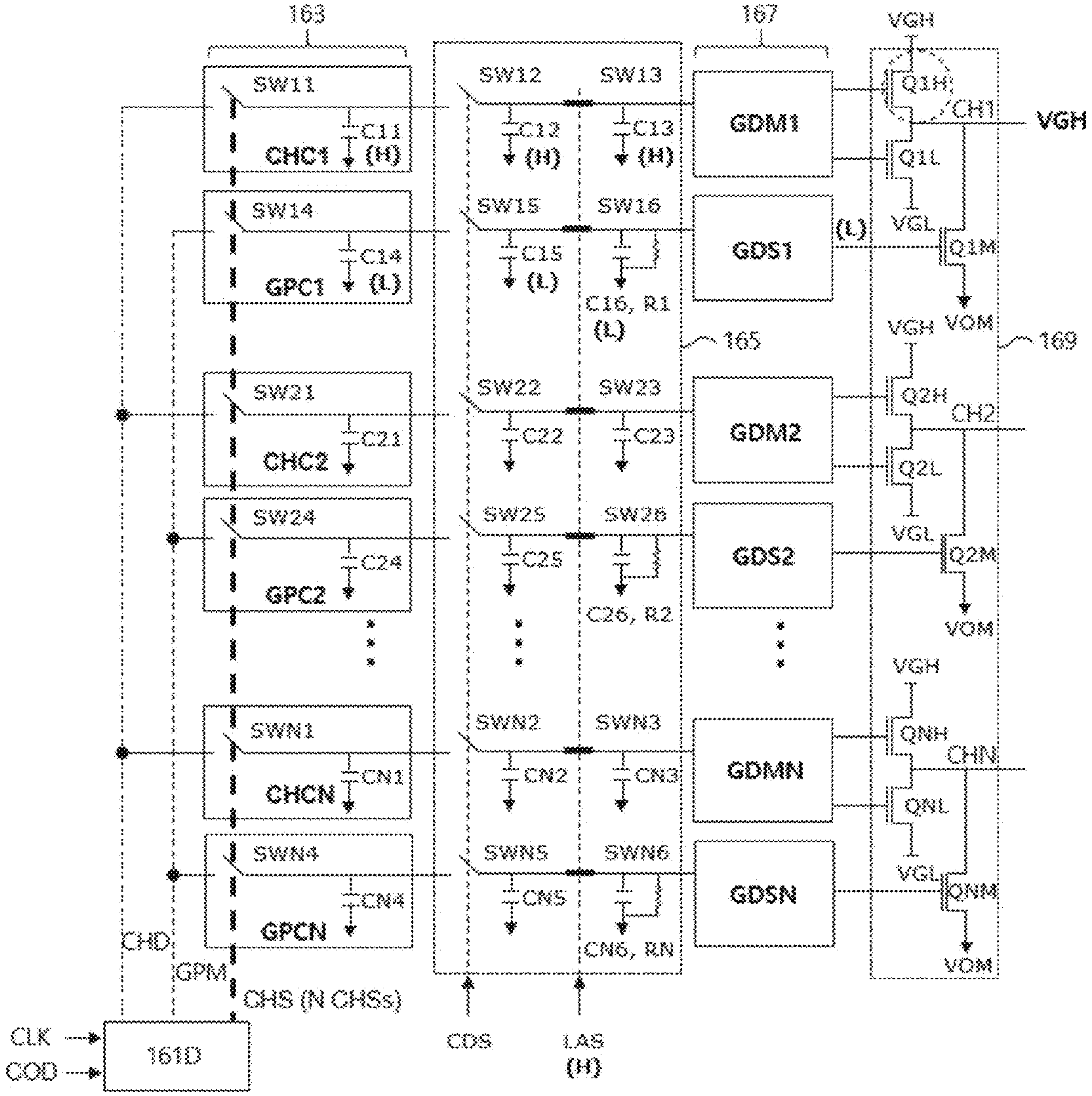

FIGS. 14 to 16 are first operation state diagrams that aid in understanding of the operation of the level shifter based on the third embodiment. Hereinafter, a description will be given of an example in which the first channel of the level shifter is selected and output.

As illustrated in FIG. 14, during a first period, the channel selection signal CHS can be output so that the first channel state value setter CHC1 and the first channel modulation value setter GPC1 in charge of the first output channel CH1 are selected. The channel state setting signal CHD can be output as a high state value H, and the channel modulation signal GPM can be output as a low state value L.

Accordingly, the eleventh state value setting switch SW11 included in the first channel state value setter CHC1 and the fourteenth state value setting switch SW14 included in the first channel modulation value setter GPC1 can be turned on. As the eleventh state value setting switch SW11 and the fourteenth state value setting switch SW14 are turned on, the eleventh state value setting capacitor C11 can be charged with a high state value H and the fourteenth state value setting capacitor C14 can be charged with a low state value L.

As illustrated in FIG. 15, during a second period, the first control signal CDS can be output as a high state value H. Accordingly, the first state value storage switches SW12 to SWN2 and the third state value storage switches SW15 to SWN5 can be turned on. As the first state value storage switches SW12 to SWN2 and the third state value storage switches SW15 to SWN5 are turned on, the twelfth state value storage capacitor C12 can be charged with a high state value H and the fifteenth state value storage capacitor C15 can be charged with a low state value L.

As illustrated in FIG. 16, during a third period, the second control signal LAS can be output as a high state value H. Accordingly, the second state value storage switches SW13 to SWN3 and the fourth state value storage switches SW16 to SWN6 can be turned on. As the second state value storage switches SW13 to SWN3 and the fourth state value storage switches SW16 to SWN6 are turned on, a high state value H can be latched in the thirteenth state value storage capacitor C13 and a low state value L can be latched in the sixteenth state value storage capacitor C16.

When operating in the above flow, the first main driving circuit GDM1 can output a first main driving signal that turns on the first high-side transistor G1H in response to the high state value H. In contrast, the first sub-driving circuit GDS1 can output a first sub-driving signal that turns off the first modulation transistor Q1M in response to the low state value L. Accordingly, the level shifter can output a gate control signal provided based on the gate high voltage VGH through the first channel CH1.

FIGS. 17 to 21 are second operation state diagrams that aid in understanding of the operation of the level shifter based on the third embodiment. Hereinafter, a description will be given of an example in which the first channel and the second channel of the level shifter are selected and output.

Figure 17:
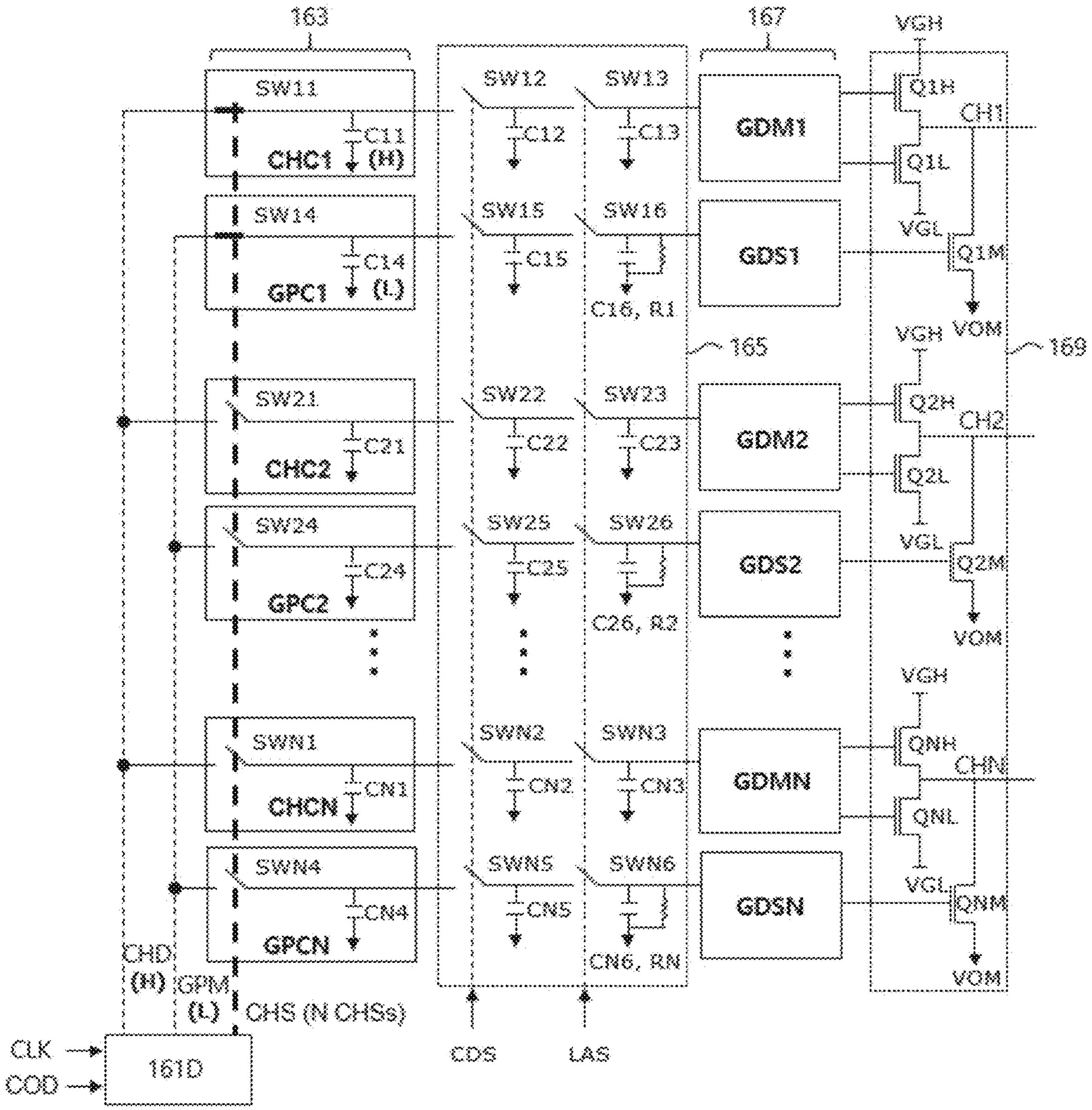
FIGS. 17 to 21 are second operation state diagrams that aid in understanding of the operation of the level shifter based on the third embodiment.

As illustrated in FIG. 17, during a first period, the channel selection signal CHS can be output to select the first channel state value setter CHC1 and the first channel modulation value setter GPC1, which are in charge of the first output channel CH1. The channel state setting signal CHD can be output as a high state value H, and the channel modulation signal GPM can be output as a low state value L.

Accordingly, the eleventh state value setting switch SW11 included in the first channel state value setter CHC1 and the fourteenth state value setting switch SW14 included in the first channel modulation value setter GPC1 can be turned on. As the eleventh state value setting switch SW11 and the fourteenth state value setting switch SW14 are turned on, the eleventh state value setting capacitor C11 can be charged with a high state value H and the fourteenth state value setting capacitor C14 can be charged with a low state value L.

Figure 18:
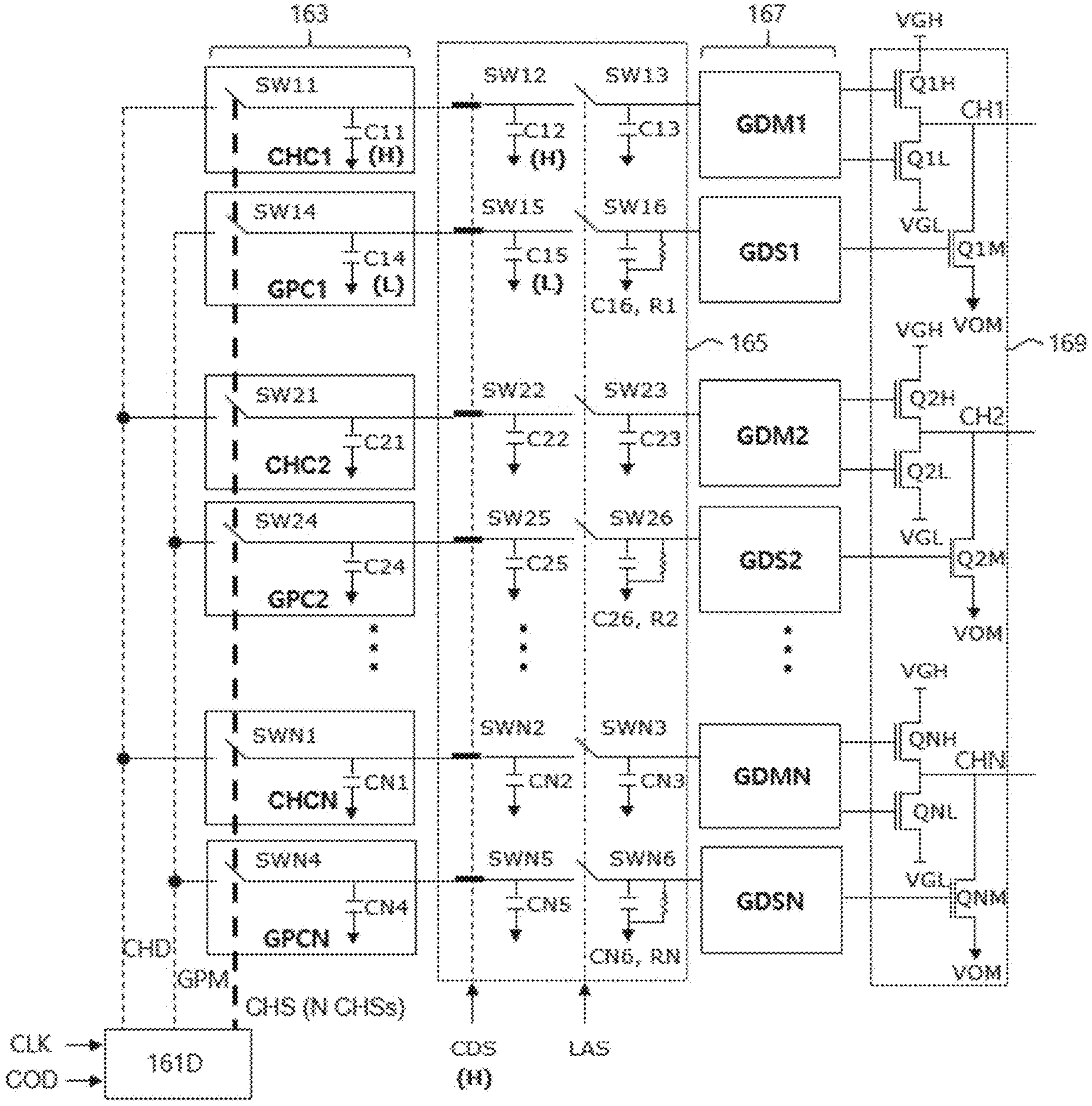

As illustrated in FIG. 18, during a second period, the first control signal CDS can be output as a high state value H. Accordingly, the first state value storage switches SW12 to SWN2 and the third state value storage switches SW15 to SWN5 can be turned on. As the first state value storage switches SW12 to SWN2 and the third state value storage switches SW15 to SWN5 are turned on, the twelfth state value storage capacitor C12 can be charged with a high state value H and the fifteenth state value storage capacitor C15 can be charged with a low state value L.

Figure 19:
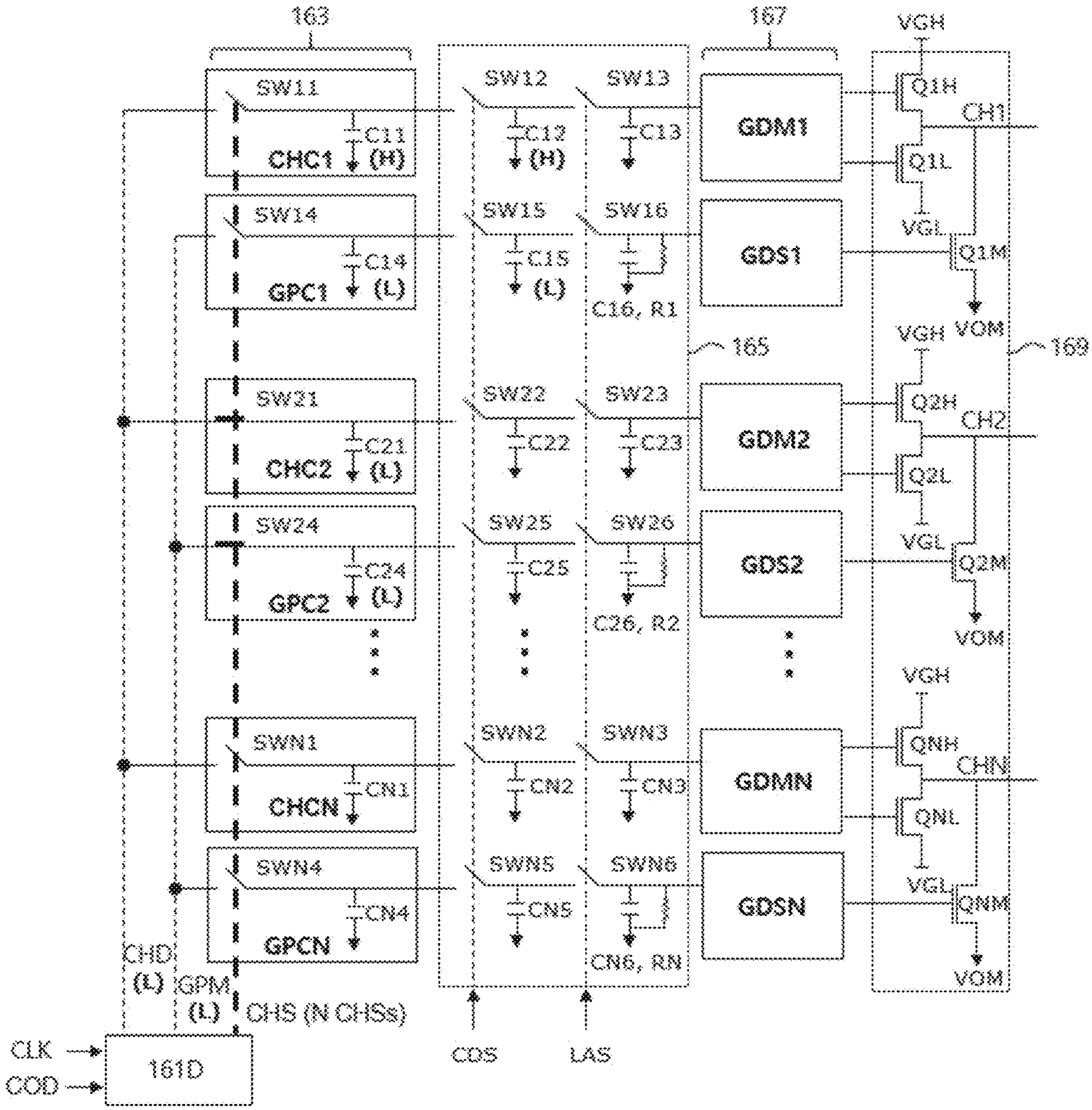

As illustrated in FIG. 19, during a third period, the channel selection signal CHS can be output to select the second channel state value setter CHC2 and the second channel modulation value setter GPC2 in charge of the second output channel CH2. The channel state setting signal CHD and the channel modulation signal GPM can be output as low state values L.

Accordingly, the twenty-first state value setting switch SW21 included in the second channel state value setter CHC2 and the twenty-fourth state value setting switch SW24 included in the second channel modulation value setter GPC2 can be turned on. As the twenty-first state value setting switch SW21 and the twenty-fourth state value setting switch SW24 are turned on, the twenty-first state value setting capacitor C21 and the twenty-fourth state value setting capacitor C24 can each be charged with a low state value L.

Figure 20:
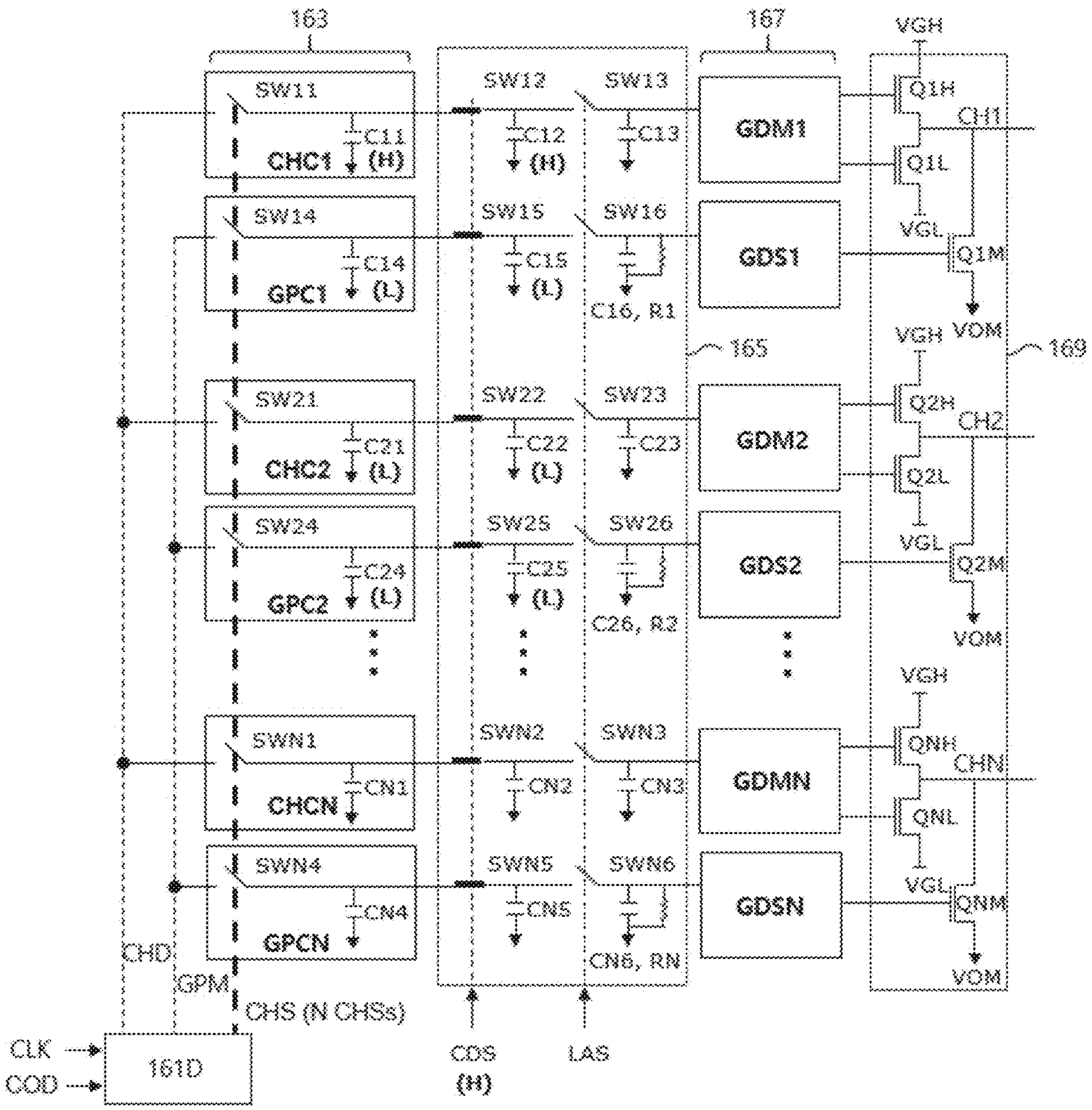

As illustrated in FIG. 20, during a fourth period, the first control signal CDS can be output as a high state value H. Accordingly, the first state value storage switches SW12 to SWN2 and the third state value storage switches SW15 to SWN5 can be turned on. As the first state value storage switches SW12 to SWN2 and the third state value storage switches SW15 to SWN5 are turned on, the twenty-second state value setting capacitor C22 and the twenty-fifth state value setting capacitor C25 can each be charged with a low state value L.

Figure 21:
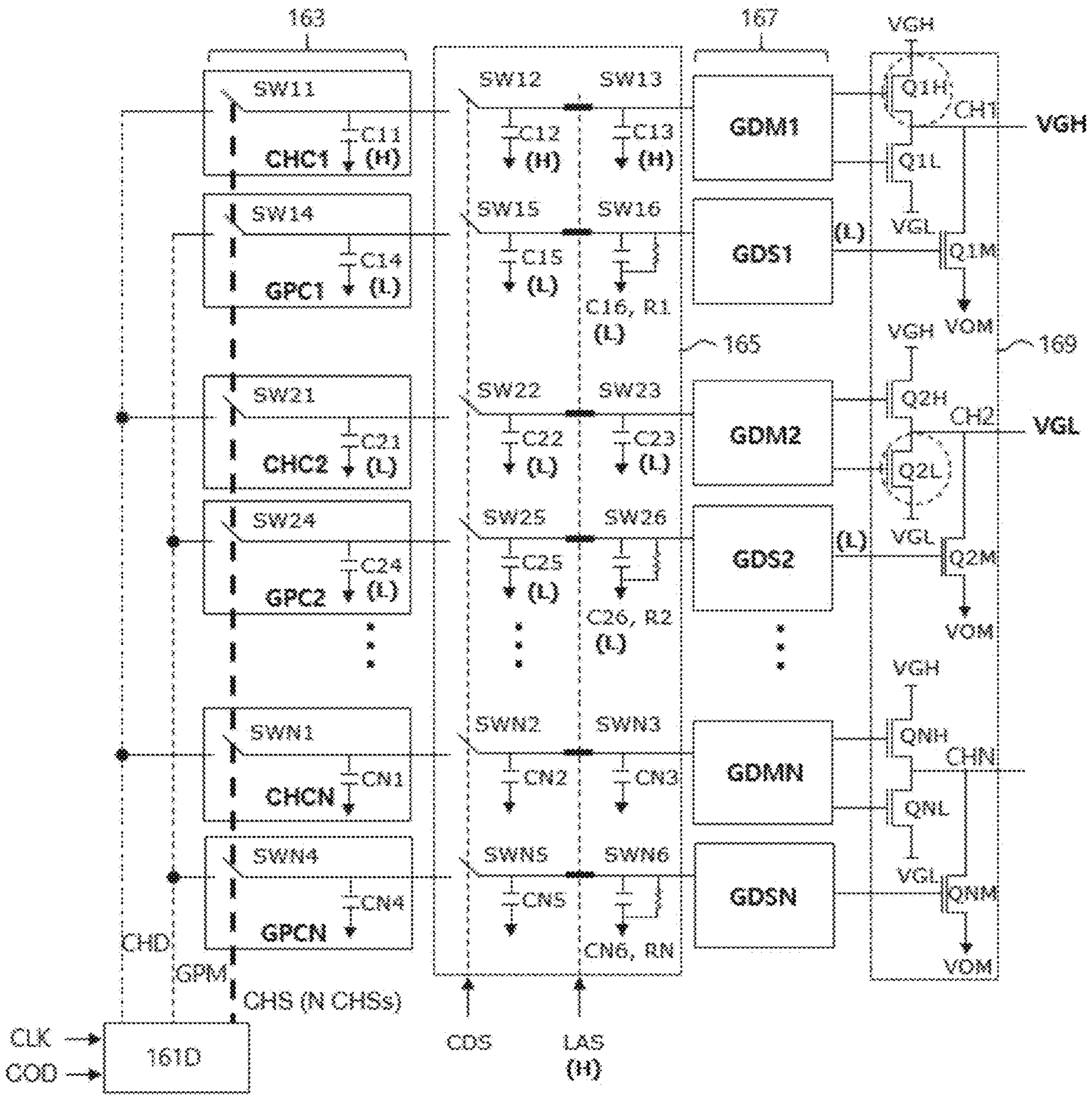

As illustrated in FIG. 21, during a fifth period, the second control signal LAS can be output as a high state value H. Accordingly, the second state value storage switches SW13 to SWN3 and the fourth state value storage switches SW16 to SWN6 can be turned on. As the second state value storage switches SW13 to SWN3 and the fourth state value storage switches SW16 to SWN6 are turned on, a high state value H can be latched in the thirteenth state value storage capacitor C13, and a low state value L can be latched in each of the sixteenth state value storage capacitor C16, the twenty-third state value storage capacitor C23, and the twenty sixth state value storage capacitor C26.

The first main driving circuit GDM1 can output the first main driving signal that turns on the first high-side transistor G1H in response to the high state value H, and the second main driving circuit GDM2 can output the second main driving signal that turns on the second low-side transistor Q2L in response to the low state value L. In contrast, the first sub-driving circuit GDS1 and the second sub-driving circuit GDS2 can output a first sub-driving signal and a second sub-driving signal that turn off the first modulation transistor Q1M and the second modulation transistor Q2M in response to the low state value L, respectively. Accordingly, the level shifter can output a gate control signal provided based on the gate high voltage VGH through the first channel CH1, and output a gate control signal provided based on the gate low voltage VGL through the second channel CH2.

FIGS. 22 to 27 are third operation state diagrams that aid in understanding of the operation of the level shifter based on the third embodiment. Hereinafter, a description will be given of an example in which the first channel and the second channel of the level shifter are selected and output and output of the second channel is modulated.

Figure 22:
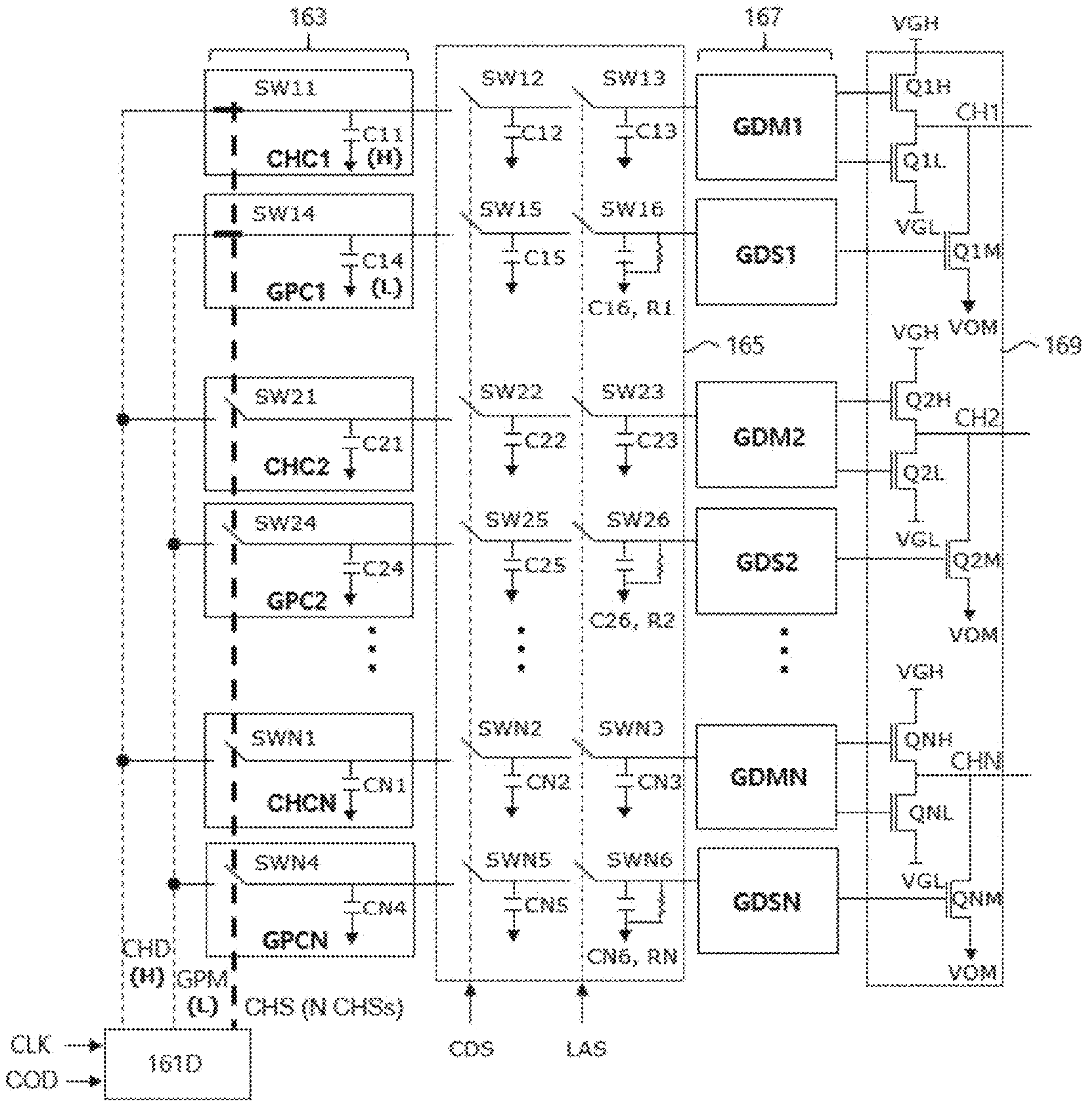
FIGS. 22 to 27 are third operation state diagrams that aid in understanding of the operation of the level shifter based on the third embodiment.

As illustrated in FIG. 22, during a first period, the channel selection signal CHS can be output to select the first channel state value setter CHC1 and the first channel modulation value setter GPC1, which are in charge of the first output channel CH1. The channel state setting signal CHD can be output as a high state value H, and the channel modulation signal GPM can be output as a low state value L.

Accordingly, the eleventh state value setting switch SW11 included in the first channel state value setter CHC1 and the fourteenth state value setting switch SW14 included in the first channel modulation value setter GPC1 can be turned on. As the eleventh state value setting switch SW11 and the fourteenth state value setting switch SW14 are turned on, the eleventh state value setting capacitor C11 can be charged with a high state value H and the fourteenth state value setting capacitor C14 can be charged with a low state value L.

Figure 23:
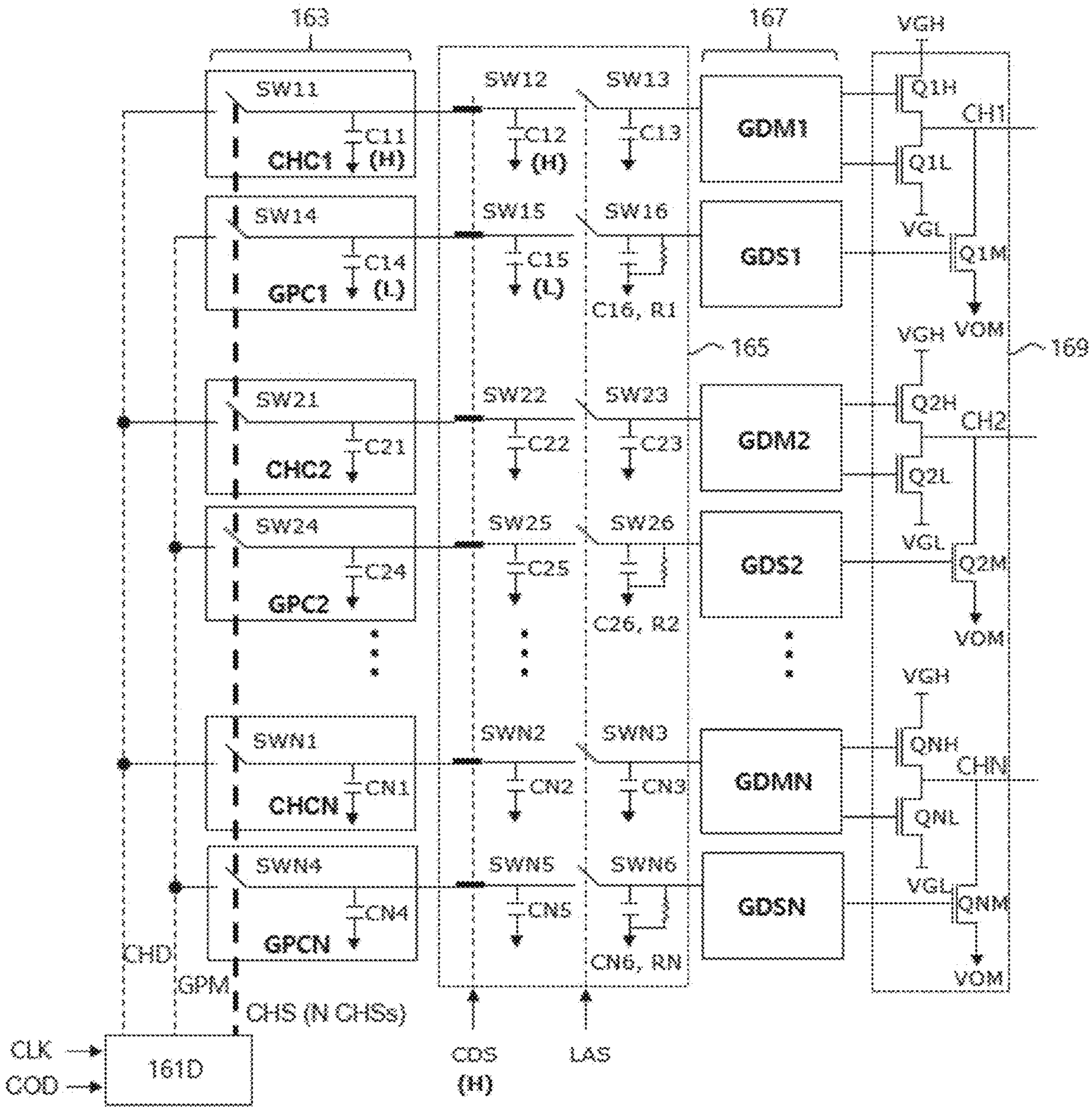

As illustrated in FIG. 23, during a second period, the first control signal CDS can be output as a high state value H. Accordingly, the first state value storage switches SW12 to SWN2 and the third state value storage switches SW15 to SWN5 can be turned on. As the first state value storage switches SW12 to SWN2 and the third state value storage switches SW15 to SWN5 are turned on, the twelfth state value storage capacitor C12 can be charged with a high state value H and the fifteenth state value storage capacitor C15 can be charged with a low state value L.

Figure 24:
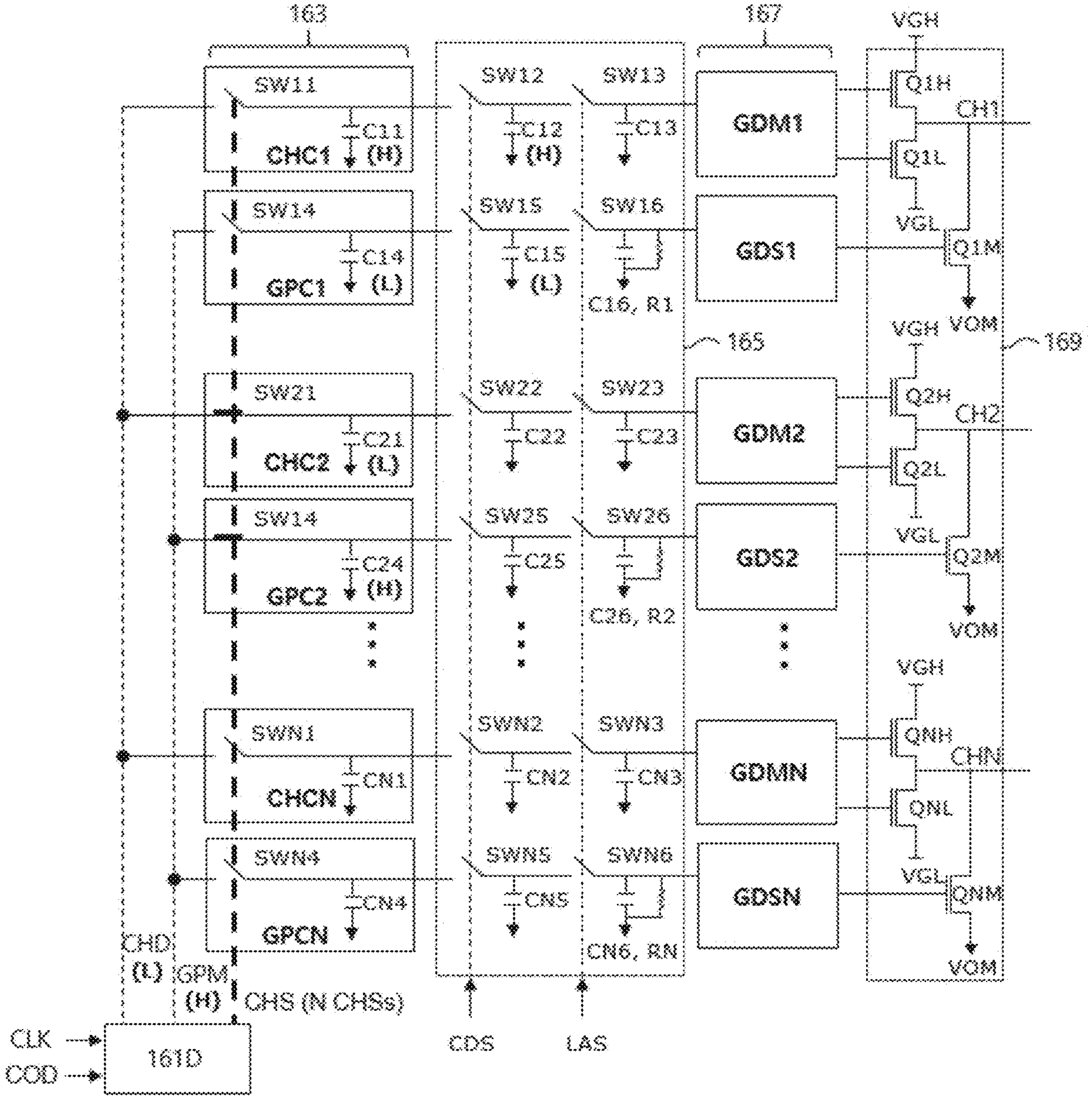

As illustrated in FIG. 24, during a third period, the channel selection signal CHS can be output to select the second channel state value setter CHC2 and the second channel modulation value setter GPC2 in charge of the second output channel CH2. The channel state setting signal CHD can be output as a low state value L, and the channel modulation signal GPM can be output as a high state value H.

Accordingly, the twenty-first state value setting switch SW21 included in the second channel state value setter CHC2 and the twenty-fourth state value setting switch SW24 included in the second channel modulation value setter GPC2 can be turned on. As the twenty-first state value setting switch SW21 and the twenty-fourth state value setting switch SW24 are turned on, the twenty-first state value setting capacitor C21 can be charged with a low state value L, and the twenty-fourth state value setting capacitor C24 can be charged with a high state value H.

Figure 25:
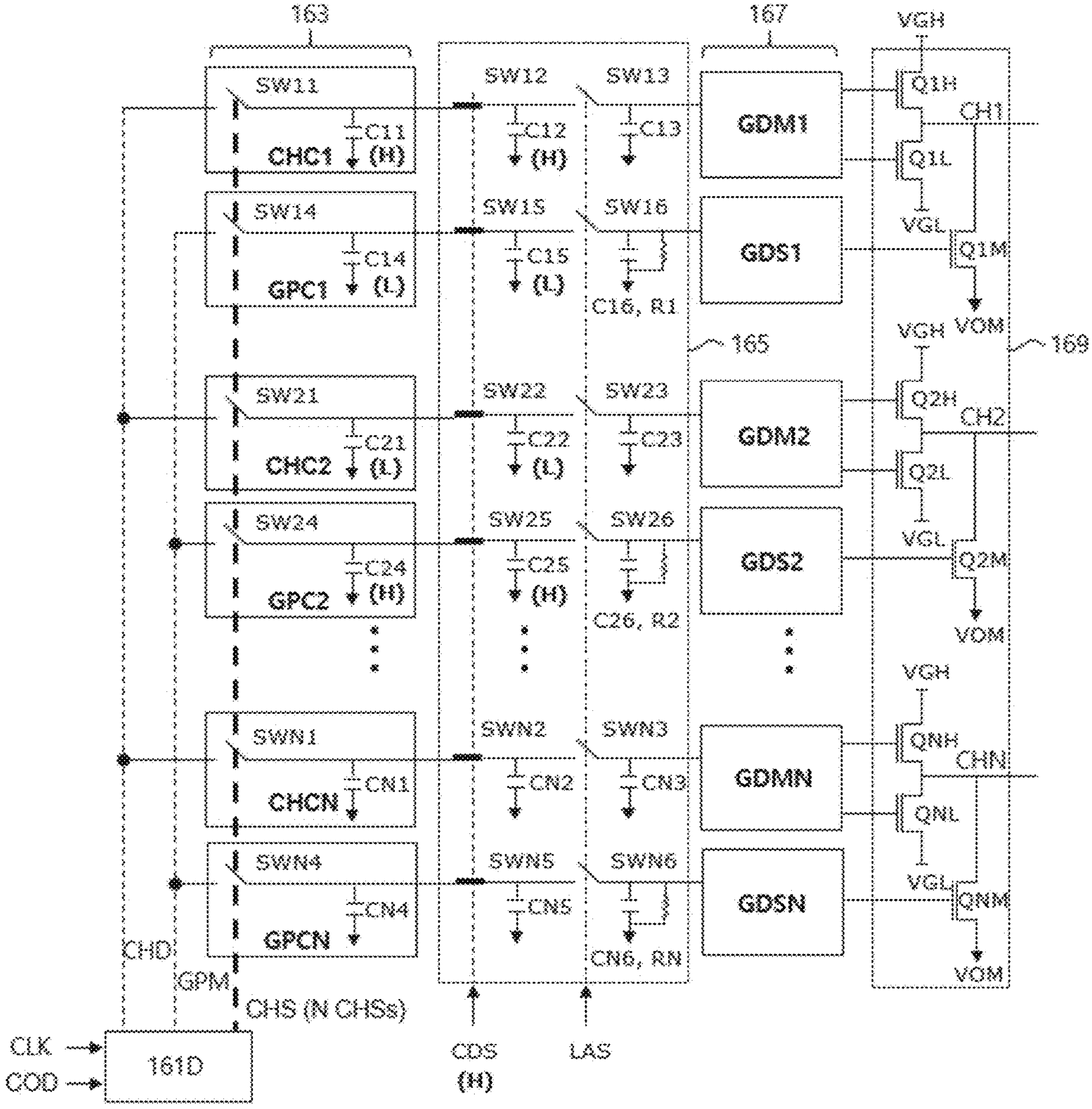

As illustrated in FIG. 25, during a fourth period, the first control signal CDS can be output as a high state value H. Accordingly, the first state value storage switches SW12 to SWN2 and the third state value storage switches SW15 to SWN5 can be turned on. As the first state value storage switches SW12 to SWN2 and the third state value storage switches SW15 to SWN5 are turned on, the twenty-second state value storage capacitor C22 can be charged with a low state value L, and the twenty-fifth state value storage capacitor C25 can be charged with a high state value H.

Figure 26:
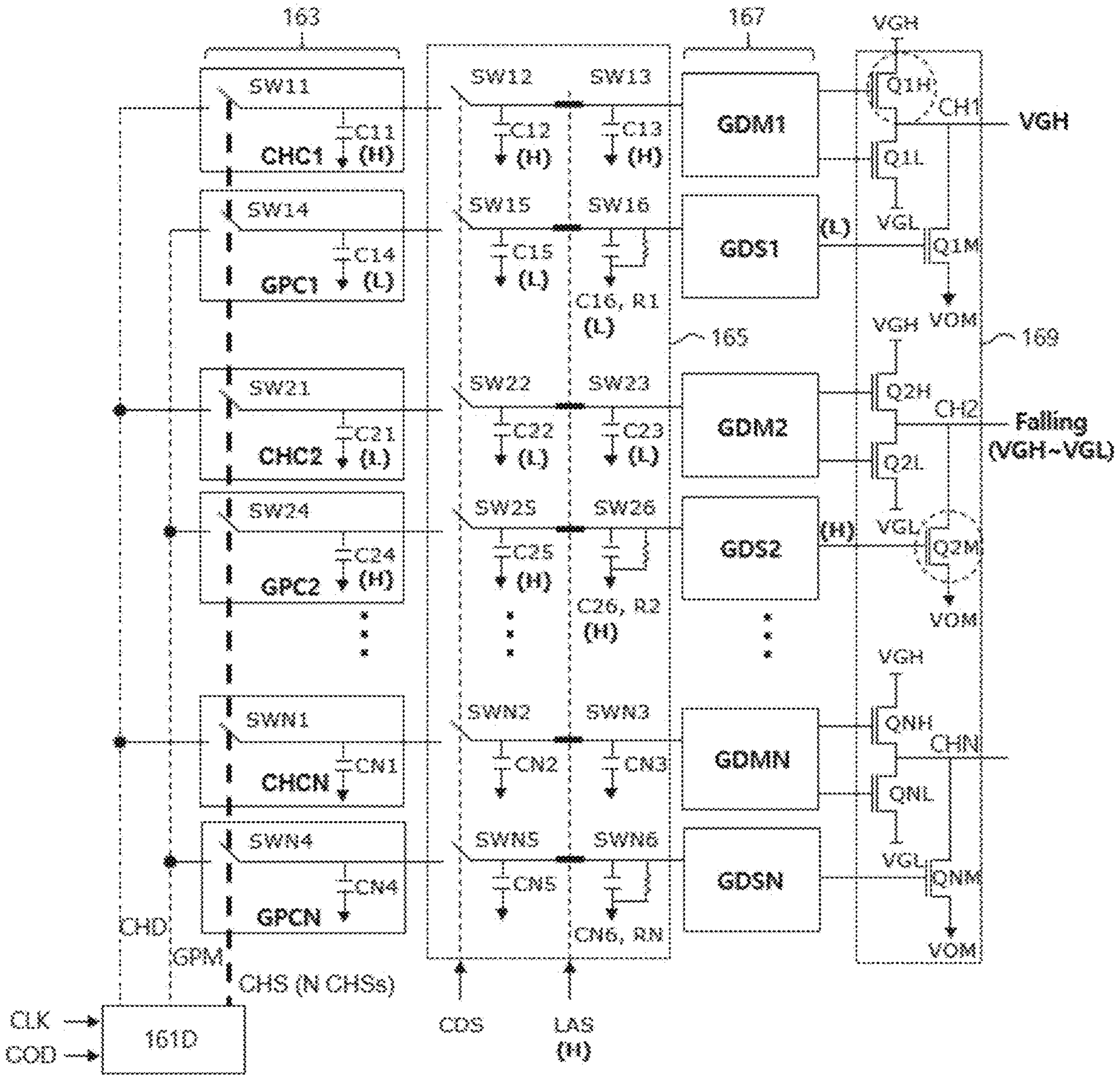

As illustrated in FIG. 26, during a fifth period, the second control signal LAS can be output as a high state value H. Accordingly, the second state value storage switches SW13 to SWN3 and the fourth state value storage switches SW16 to SWN6 can be turned on. As the second state value storage switches SW13 to SWN3 and the fourth state value storage switches SW16 to SWN6 are turned on, a high state value H can be latched in each of the thirteenth state value storage capacitor C13 and the twenty-sixth state value storage capacitor C26, and a low state value L can be latched in each of the sixteenth state value storage capacitor C16 and the twenty-third state value storage capacitor C23.

The first main driving circuit GDM1 can output a first main driving signal that turns on the first high-side transistor G1H in response to a high state value H, and the second sub-driving circuit GDS2 can output a second sub-driving signal that turns on the second modulation transistor Q2M. Accordingly, the level shifter can output a gate control signal prepared based on the gate high voltage VGH through the first channel CH1, and temporarily output a gate control signal prepared based on a falling voltage (or modulation voltage) falling between the gate high voltage VGH and the gate low voltage VGH through the second channel CH2.

Figure 27:
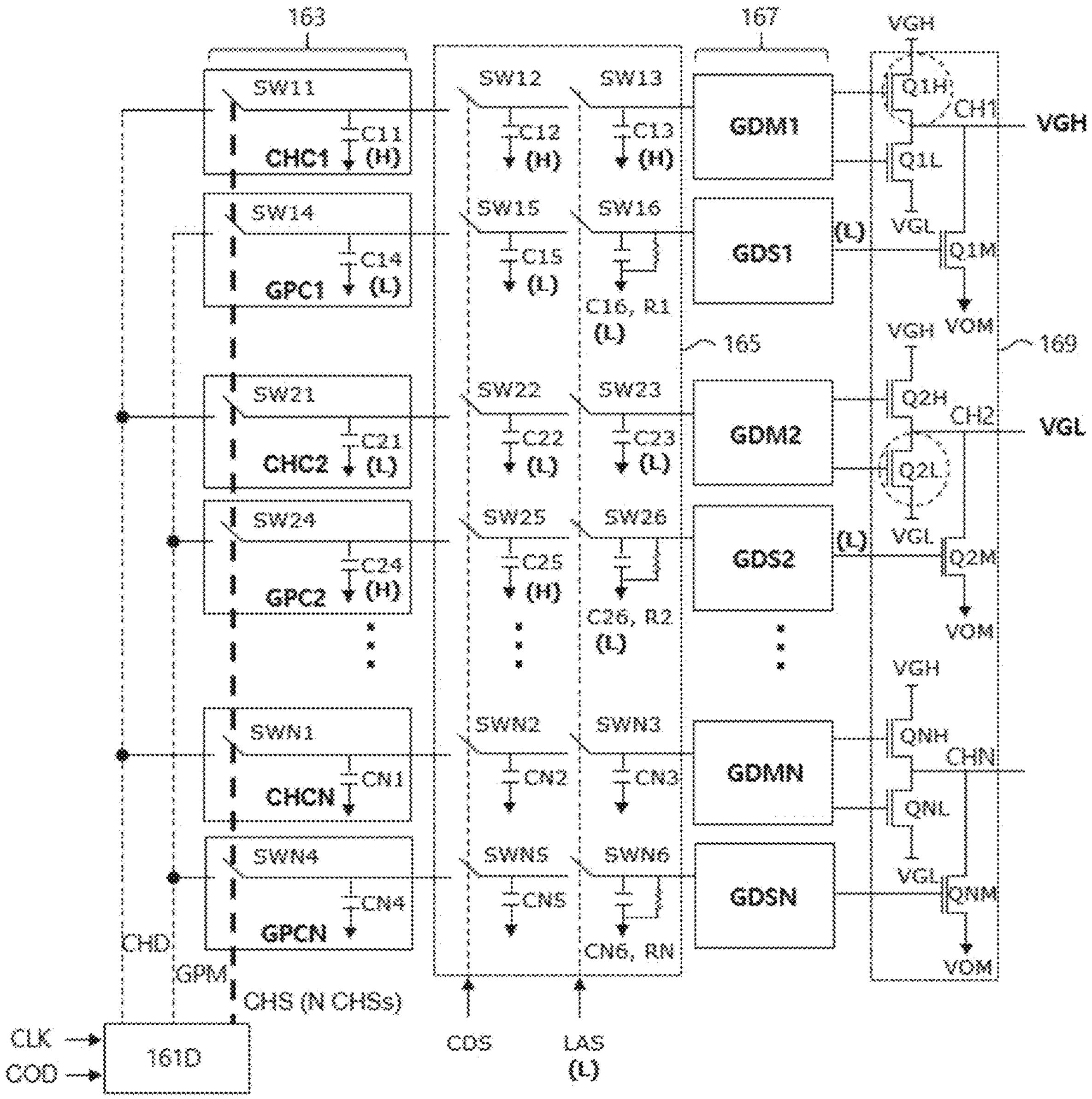

As illustrated in FIG. 27, during a sixth period, the second control signal LAS can be output as a low state value L. Accordingly, the second state value storage switches SW13 to SWN3 and the fourth state value storage switches SW16 to SWN6 can be turned off. As the second state value storage switches SW13 to SWN3 and the fourth state value storage switches SW16 to SWN6 are turned off, the high state value H latched in the twenty-sixth state value storage capacitor C26 can be discharged by the second resistor R2.

As a result, a state value of the twenty-sixth state value storage capacitor C26 can be changed from a high state value H to a low state value L. Further, the second main driving circuit GDM2 can output a second main driving signal that turns on the second low-side transistor Q2L in response to the low state value L. Accordingly, the level shifter can output a gate control signal prepared based on the gate high voltage VGH through the first channel CH1, and output a gate control signal prepared based on the gate low voltage VGL through the second channel CH2.

Meanwhile, in the above examples, while describing the first operation state to aid in understanding of the operation of the level shifter, the operation has been described as being sequentially performed by being divided by period. However, at least one period can be simultaneously performed, or the period can be divided into the first half period and the second half period and simultaneously performed.

As mentioned above, the present disclosure has an effect of being able to reduce the number of data bits for specifying an output channel when using a serial-parallel interface between a level shifter and a timing controller. In addition, the present disclosure has an effect of being able to shorten data transmission and reception time by reducing the number of data bits when using a serial-parallel interface between a level shifter and a timing controller. In addition, the present disclosure has an effect of being able to easily specify an output channel and an output state and easily modulate (gate voltage modulation) a level of an output voltage when using a serial-parallel interface between a level shifter and a timing controller.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A display device comprising:
a display panel configured to display an image;
a scan driver configured to supply a scan signal to the display panel;
a level shifter configured to generate gate control signals to drive the scan driver;
a power supply configured to supply a voltage to the level shifter; and
a timing controller configured to control the level shifter,
wherein the level shifter comprises a level shifter output setting circuit implemented so that at least one output channel is selected based on transmission signals supplied from the timing controller and an output state of the selected output channel is selected as a high voltage or a low voltage, and
wherein the level shifter output setting circuit comprises:
a state value setter configured to set an output state of the selected output channel based on a first part of the transmission signals;
a state value storage configured to temporarily store a state value in the state value setter based on a second part of the transmission signals in a storage prepared therein;
a driving circuit configured to generate a driving signal based on the state value stored in the state value storage; and
an output circuit configured to operate based on the driving signal generated from the driving circuit and output the high voltage or the low voltage based on a gate high voltage and a gate low voltage supplied from the power supply.

2. The display device according to claim 1, wherein the level shifter output setting circuit selects the at least one output channel in response to a first bit value included in the transmission signals, and selects an output state of the selected output channel in response to a second bit value included in the transmission signals as the high voltage or the low voltage.

3. The display device according to claim 2, wherein the level shifter output setting circuit modulates a level of the high voltage or the low voltage in response to a third bit value included in the transmission signals.

4. The display device according to claim 1, wherein the state value setter comprises:
state value setting switches configured to be turned on in response to a channel selection signal among the transmission signals; and
state value setting capacitors configured to store a high state value or a low state value in response to a channel state setting signal among the transmission signals.

5. The display device according to claim 4, wherein the state value storage comprises:

first state value storage switches configured to be turned on in response to a first control signal among the transmission signals;

first state value storage capacitors configured to store state values stored in the state value setting capacitors in response to switching operations of the first state value storage switches;

second state value storage switches configured to be turned on in response to a second control signal among the transmission signals; and second state value storage capacitors configured to latch the state values stored in the first state value storage capacitors in response to switching operations of the second state value storage switches.

6. A level shifter comprising:

a reception circuit configured to receive transmission signals transmitted from an exterior; and a level shifter output setting circuit implemented so that at least one output channel is selected based on the transmission signals and an output state of the selected output channel is selected as a high voltage or a low voltage, and wherein the level shifter output setting circuit comprises:

a state value setter configured to set an output state of the selected output channel based on a first part of the transmission signals;

a state value storage configured to temporarily store a state value in the state value setter based on a second part of the transmission signals in a storage prepared therein;

a driving circuit configured to generate a driving signal based on the state value stored in the state value storage; and an output circuit configured to operate based on the driving signal generated from the driving circuit and output the high voltage or the low voltage based on a gate high voltage and a gate low voltage supplied from the exterior.

7. The level shifter according to claim 6, wherein the level shifter output setting circuit selects the at least one output channel in response to a first bit value included in the transmission signals, and selects an output state of the selected output channel in response to a second bit value included in the transmission signals as the high voltage or the low voltage.

8. The level shifter according to claim 7, wherein the level shifter output setting circuit modulates a level of the high voltage or the low voltage in response to a third bit value included in the transmission signals.

* * * * *